(12) United States Patent
Craven

(10) Patent No.: US 7,756,592 B2
(45) Date of Patent: Jul. 13, 2010

(54) ENHANCED FEEDBACK FOR PLANT CONTROL

(76) Inventor: Peter Craven, 2, Wood Cottages, The Street, Thakeham, Pulborough (GB) RH20 3EP ( * ) Notice: Subject to any disclaimer, the term of this patent is extended or adjusted under 35 U.S.C. 154(b) by 339 days.

(21) Appl. No.: 11/323,929

(22) Filed: Dec. 30, 2005

(65) Prior Publication Data

US 2007/0156262 A1 Jul. 5, 2007

(51) Int. Cl.
*G05B 13/02* (2006.01)
(52) U.S. Cl. .......................... 700/30; 381/71.1; 700/44
(58) Field of Classification Search .............. 700/73, 700/28–31, 39, 71, 72, 38, 44; 381/71.14, 381/71.1; 702/79
See application file for complete search history.

(56) References Cited

U.S. PATENT DOCUMENTS

| 5,303,142 | A | * | 4/1994 | Parsons et al. ................. 700/40 |
| 5,553,153 | A | * | 9/1996 | Eatwell .................... 381/71.12 |
| 5,680,450 | A | | 10/1997 | Dent et al. |
| 5,692,055 | A | * | 11/1997 | Sano et al. ................ 381/71.11 |
| 5,815,582 | A | * | 9/1998 | Claybaugh et al. .......... 381/71.6 |
| 5,901,059 | A | * | 5/1999 | Tao et al. ....................... 700/29 |
| 7,149,590 | B2 | * | 12/2006 | Martin et al. .................. 700/44 |
| 7,239,257 | B1 | * | 7/2007 | Alexander et al. ........... 341/138 |
| 7,277,764 | B2 | * | 10/2007 | Hovakimyan et al. ......... 700/28 |
| 2002/0111758 | A1 | * | 8/2002 | Wang et al. .................... 702/79 |
| 2003/0060902 | A1 | * | 3/2003 | Miller .......................... 700/32 |
| 2004/0125003 | A1 | * | 7/2004 | Craven et al. .................. 341/76 |

FOREIGN PATENT DOCUMENTS

EP    1 003 154 A2    5/2000

OTHER PUBLICATIONS

"European Standard Search Report", mailed Jun. 28, 2006, 3pgs.

* cited by examiner

*Primary Examiner*—Paul L Rodriguez
*Assistant Examiner*—Nathan Laughlin
(74) *Attorney, Agent, or Firm*—Buckley, Maschoff & Talwalkar LLC

(57) ABSTRACT

A method and system for controlling the behavior of a plant having an input and an output by enhanced feedback. A simulation input signal is derived from an input to be applied to the plant and a simulated signal is generated by simulating an aspect of an assumed behavior of the plant in dependence on the simulation input signal. The simulated signal is subtracted from a plant feedback signal which is derived from an output of the plant and the resulting difference signal is used to modify the input signal by feedback prior to deriving a plant input signal. The simulation may take into account derivation of the plant feedback signal and the input signal is typically modified so as to reduce the effect on the output signal of a deviation in actual behavior of the plant from the assumed behavior of the plant over a predetermined operating frequency range.

45 Claims, 20 Drawing Sheets

| i | tap[i] | tap[16+i] | tap[32+i] | tap[48+i] | tap[64+i] |
|---|---|---|---|---|---|
| 0 | 0.01836739 | 0.03734201 | 0.02677137 | -0.03957508 | 0.01959769 |
| 1 | 0.01866660 | 0.04667572 | 0.00736557 | -0.02606826 | 0.01586066 |
| 2 | 0.02143722 | 0.04696125 | 0.00074389 | -0.02085951 | 0.01421720 |
| 3 | 0.02483227 | 0.04533122 | -0.00361645 | -0.01692403 | 0.01287703 |
| 4 | 0.02872951 | 0.04227169 | -0.00645628 | -0.01374983 | 0.01170496 |
| 5 | 0.03314426 | 0.03773281 | -0.00771946 | -0.01136110 | 0.01070354 |
| 6 | 0.03810359 | 0.03161875 | -0.00728109 | -0.00982844 | 0.00988724 |
| 7 | 0.04363611 | 0.02382738 | -0.00500662 | -0.00922910 | 0.00927228 |
| 8 | 0.04977115 | 0.01425356 | -0.00075672 | -0.00964369 | 0.00887575 |
| 9 | 0.05653861 | 0.00278953 | 0.00561224 | -0.01115590 | 0.00871557 |
| 10 | 0.06396901 | -0.01067506 | 0.01424800 | -0.01385236 | 0.00881045 |
| 11 | 0.07209334 | -0.02625270 | 0.02530191 | -0.01782231 | 0.00917978 |
| 12 | 0.08094214 | -0.04405447 | 0.03892357 | -0.02315400 | 0.00984276 |
| 13 | 0.09053434 | -0.06414651 | 0.05519613 | -0.02989119 | 0.01080718 |
| 14 | 0.10073951 | -0.08601366 | 0.07333889 | -0.03749679 | 0.01193171 |
| 15 | 0.10957716 | -0.10193945 | 0.08186866 | -0.03823784 | 0.01122776 |

| i | H[i] | H[5+i] | H[10+i] | H[15+i] | H[20+i] |
|---|---|---|---|---|---|
| 0 | 0.82512274 | -1.49945807 | 0.65335414 | -0.47229215 | 0.45884075 |
| 1 | 1.62176745 | -0.58335573 | 0.46411603 | -0.44992039 | 0.31327908 |
| 2 | 1.03876942 | 0.24500844 | 0.17230418 | -0.30258804 | -0.02447150 |
| 3 | -0.56168225 | 0.64285441 | -0.14021477 | -0.02718102 | -0.22301130 |
| 4 | -1.66228078 | 0.72528491 | -0.37063281 | 0.29362142 | -0.13836652 |

US 7,756,592 B2

ENHANCED FEEDBACK FOR PLANT CONTROL

FIELD OF THE INVENTION

The present invention relates to use of feedback for controlling a device or system characterised generically as a plant.

BACKGROUND TO THE INVENTION

Many techniques are known in many technical fields for controlling the response or behaviour of a device or system. In Control Theory literature, the term "plant" is generally used to refer to such a device whose behaviour we are trying to control. In this context, a plant could be anything from the tiny armature that carries the cutting stylus of an LP disc-cutting head to a space-rocket whose motion we are sensing and trying to control by sending instructions to its motors. Other examples include the power output stage of an amplifier and a mechanical actuator. Indeed, the concept can be extended to include control of a complete factory or chemical processing plant.

A substantial part of the control theory literature addresses the control of systems, for example biological systems, in which the effect of adjusting a control input may be extremely uncertain a priori, so that the controller must estimate the linear and nonlinear transfer functions of the plant starting from very little a priori information. The present invention is directed more towards systems whose behaviour is known well enough for a reasonable model to be constructed.

Predistortion is a technique whereby an imperfect 'plant' P is preceded by a corrector that approximates its inverse $P^{-1}$, as shown in FIG. 1. Similarly, there is also postdistortion in which the corrector is placed afterwards. Either method begs the question of how the inverse $P^{-1}$ can be calculated or implemented. Gerzon made a fundamental contribution in 1972 by exhibiting a method whereby an approximate inverse could be constructed provided that multiple instances or replicas of P could be made available (Gerzon, M. A., "Predistortion Techniques for Complex but Predictable Transmission Systems", J. Audio Eng. Soc., Volume 20, pp. 475-482, July 1972). For example, in the case of the audio distortion produced by bandlimiting in the Intermediate Frequency (IF) section of an FM radio receiver, Gerzon showed how the inverse distortion could be produced using one or more low-power copies of the actual FM transmission system. Gerzon's approximate inverse would then be placed prior to the FM modulator in the actual radio transmitter. Today, Gerzon's approximate inverse would typically be implemented in digital signal processing (DSP) software, the "low-power copies" being implemented as software modules that model the transmitter and receiver combination.

Feedback is a technique whereby the input to the plant is modified in dependence on its output. An example is shown in FIG. 2, where a system input feeds the plant P, which provides the system output. A subtraction node takes the difference between the system's output and its input, thereby deriving an error signal that is filtered by feedback filter G and then fed to the plant's input in a polarity such as to reduce the error. In the example shown, a subtraction node is employed. If the plant has several inputs and output, G may be a matrix filter, but for simplicity we shall concentrate on the 1-channel case.

There are many feedback topologies in the electronics literature, some of which have been described as 'novel'. In fact, as long as it is the plant P that provides the system output and P is the only nonlinear component in the system, all these topologies are equivalent modulo overall frequency response. That is to say, any one topology can be made equivalent to any other by suitable adjustment of the transfer functions of the various blocks, and maybe by adding a linear filtering stage at the input to provide the desired system transfer function.

The potential benefits of feedback include: ironing out irregularities in the plant's frequency response and reducing nonlinearities and noise introduced by the plant. The classic problem of feedback design is to apply enough feedback for the desired performance improvement while keeping the system stable. The 'control theory' literature considers this problem at length. In the linear case, the problem is amenable to mathematical analysis, though the equations may nevertheless be daunting.

Most introductory books on control theory devote one or at most two chapters to the nonlinear case. In dealing with weakly nonlinear systems, engineers frequently start from an assumption of linearity, but allow some margin ("phase margin" or "gain margin") in the hope that deviations from the linearity will not be large enough to send the system unstable. Other factors that may be allowed for in assessing the stability margin are unknown external conditions (e.g. load), component tolerances and component drift with temperature and/or time.

The techniques of predistortion and feedback both have associated strengths and weaknesses. Predistortion can correct for known nonlinearity of the plant and does not have stability problems, but is powerless to deal with deviations from the expected plant behaviour. Feedback can correct both known and unknown nonlinearity of the plant, and can correct other deviations from the expected behaviour, but may be sent unstable if the nonlinearities or other deviations are too large.

A natural extension to these techniques is to use a combination of predistortion and feedback. FIG. 3 illustrates an example of this in which the principle being applied may be summarised as "correct what you can by means other than feedback, then apply overall feedback to tidy up what remains". Here, $P^{-1}$ has a direct effect in reducing the distortion that appears on the output, and also potentially an indirect effect because the improved linearity of the combination ($P^{-1}.P$) may make it possible to apply more feedback before instability sets in.

This technique can be extremely effective when it works, but in some cases P may not have a causal inverse. Provided P's nonlinearity is not too strong, the Gerzon procedure may still be used but now it returns a pseudo-inverse $P^{-1}$ such that ($P^{-1}.P$) approximates a pure delay. Indeed, successively more accurate higher-order approximations generated by the Gerzon procedure incur more and more delay. In a feedback system, loop delay is usually the prime determining factor that limits the amount of feedback that can be stably applied. Thus, with the delay introduced by the Gerzon predistortion, the system shown in FIG. 3 may be unable to support sufficient feedback to correct adequately the unknown disturbances that are not corrected by $P^{-1}$. To restate the problem, the plant P may itself have a delay, and there is nothing that can be done about that. It will limit the feedback. The unfortunate consequence of the system shown in FIG. 3 is that $P^{-1}$ may further increase the delay.

FIG. 4 shows another prior-art feedback topology that may be employed. The operation of the system shown in FIG. 4 may be understood by considering that any error e committed by P is isolated by the subtraction node at the bottom of the figure and, after filtering with filter H, is subtracted from the input by means of an addition unit with negative polarity input. Assuming that H has unity gain within the frequency range of interest, and that P also approximates unity gain, the error is approximately cancelled at the output.

This "inner form" topology is widely used in noise shaping, in which the "plant" P is actually a quantiser, and the reason for the feedback is to reduce quantisation noise (or at least, to reduce it within a particular frequency range). This is a pure digital application, in which linearity is taken for granted and stability can be ensured (subject to start-up conditions and adequate arithmetic headroom) by a purely linear analysis.

In a simplest "first order" noise shaper, H is just a $z^{-1}$ unit delay, which is needed to avoid a delay-free feedback loop. Such a unit delay has unity gain at DC, but has a phase rotation that increases as frequency increases. Much effort has been applied to designing digital filters H that incorporate the unit delay but then compensate the phase rotation so as to provide a close approximation to unity gain over some desired frequency range. However, it should be noted that, in order provide effective cancellation of error over a desired frequency range, it is sometimes necessary to give H a large gain at frequencies outside that frequency range.

In view of the prior art techniques described above, there is a need for a robust technique that combines advantages of predistortion and feedback and is able to correct for both known and unknown nonlinearities, particularly where the nonlinearity is large enough to cause a conventional control system to go unstable.

SUMMARY OF THE INVENTION

According to a first aspect of the present invention, a method of controlling the behaviour of a plant having an input and an output by feedback comprises the steps of:

receiving an input signal;

deriving a plant input signal and a simulation input signal from the input signal;

applying the plant input signal to the input of the plant;

deriving a plant feedback signal from an output of the plant;

generating a simulated signal by simulating an aspect of an assumed behaviour of the plant in dependence on the simulation input signal;

generating a difference signal by subtracting the simulated signal from the plant feedback signal; and, modifying the input signal by feedback in dependence on the difference signal, wherein the step of modifying the input signal by feedback is performed prior to the step of deriving the plant input signal and the simulation input signal from the input signal.

The present invention provides a method for controlling the behaviour of a plant that combines some of the advantages of both the feedback and predistortion techniques. It is able to correct both the known and the unknown nonlinearities of the plant, with the advantage that it is only the unknown nonlinearities (or other deviations from assumed behaviour) that have the potential to send the system unstable. The simulated signal, which is used to generate the difference signal, is generated after the feedback is applied to the input and is therefore affected by it.

The present invention is applicable to situations in which the plant has a relatively large known nonlinearity that would cause a conventional feedback system to go unstable, while also having noise or unknown nonlinearities or other deviations from ideal response that it is desired to correct.

Preferably, the step of generating the simulated signal further comprises simulating the step of deriving the plant feedback signal. In this way, any sampling or modification of the output signal to generate a feedback signal may be taken into account by the simulation to provide an accurate difference signal in dependence on which the input signal is modified.

Preferably, the step of modifying the input signal by feedback reduces the effect on the plant output of a deviation in actual behaviour of the plant from the assumed behaviour of the plant over a predetermined operating frequency range. In this way, stable operation of the plant may be maintained over a particular chosen frequency range.

In a simple implementation, the step of deriving a plant feedback signal merely comprises taking a replica of the output of the plant. In an electronic device this may be achieved by "tapping off" some of the output of the plant. Alternatively, the plant feedback signal may be derived by measuring the plant output in some way. The deriving step may also involve further processing to isolate particular information.

Simulating the response of the plant may include modelling several aspects, including a delay or all-pass characteristic, a nonlinear behaviour and an overload behaviour.

The simulation may be based on a predetermined characterisation of the plant at start-up. Alternatively, or additionally, the simulation may be performed responsively to factors influencing the behaviour of the plant or to the behaviour of the plant itself. In this way, dynamic adaptive control of the simulation can be achieved.

Typically, the input signal will be modified by application of a feedback signal, which is derived by filtering the difference signal to compensate substantially the small-signal amplitude response of the plant over the operating frequency range.

According to a second aspect of the present invention, a feedback controller for controlling a plant comprises:

a first input for receiving an input signal;

a second input adapted to receive an output signal from the plant;

an output coupled to the first input, the output adapted to provide an input signal to the plant;

a simulator coupled to the controller output, the simulator adapted to generate a simulated signal by simulating an aspect of an assumed behaviour of the plant in dependence on the plant input signal;

a difference unit coupled to the second input and to the simulator, the difference unit configured to provide a difference signal in dependence on the plant output signal and the simulated signal; and, a modifying unit coupled to the difference unit and to the first input, the modifying unit adapted to modify the input signal in dependence on the difference signal.

The feedback controller can be modified for use with a wide range of devices and systems that constitute a plant and can implement the method of the first aspect. The input signal provided to the plant and the output signal obtained from the plant can equally be manifested in a variety of forms, including electrical, acoustical and mechanical.

Preferably, the modifying unit is adapted to modify the input signal to reduce the effect on the plant output signal over a predetermined operating frequency range of a deviation in actual behaviour of the plant from the assumed behaviour of the plant.

The modifying unit will typically comprise a filter adapted to compensate substantially the small-signal amplitude response of the plant over the operating frequency range.

A predistortion unit may be employed prior to the feedback, the predistortion unit adapted to compensate a nonlinear behaviour of the plant.

Preferably, an adaptation unit is coupled to the plant and the simulator, the adaptation unit adapted to dynamically adjust the simulator in dependence on the actual behaviour of the plant. The adaptation unit may also be coupled to the modifying unit (e.g. filter) to provide dynamic adaptive control of this unit as well.

According to a third aspect of the present invention, a feedback-controlled plant comprises a feedback controller according to the second aspect and a plant having an input and an output, wherein the plant input is coupled to the output of the controller and the plant output is coupled to the second input of the controller.

The plant itself may take many forms, for example an electronic amplifier, an audio loudspeaker or headphone.

In the case of a loudspeaker, the second input of the feedback controller may be adapted to receive an acoustical signal generated by the loudspeaker. Alternatively, the second input of the controller may be adapted to receive a mechanical signal generated by the loudspeaker.

Greater control over the loudspeaker may be obtained if the plant further comprises a plurality of microphones that are configured to provide an output representing a nonlinear aspect of an acoustical signal generated by the loudspeaker and which is received by a listener situated at a greater distance from the loudspeaker than the plurality of microphones.

The feedback-controlled plant may comprise a splitter that receives the input signal and provides a plant input signal and a simulation input signal. Typically, the input signal will be split to provide two replica signals.

As will be appreciated, the feedback controller according to the present provides for robust control of a plant, combining advantages of predistortion and feedback techniques and able to correct for both known and unknown nonlinearities, which would cause a conventional control system to go unstable. The controller may be designed and fitted to a range of standalone devices and systems. Alternatively, the controller may form an integral part of a feedback-controlled device in pre-packaged form.

BRIEF DESCRIPTION OF THE DRAWINGS

Examples of the present invention will now be described in detail with reference to the accompanying drawings, in which.

DETAILED DESCRIPTION

Figure 4:
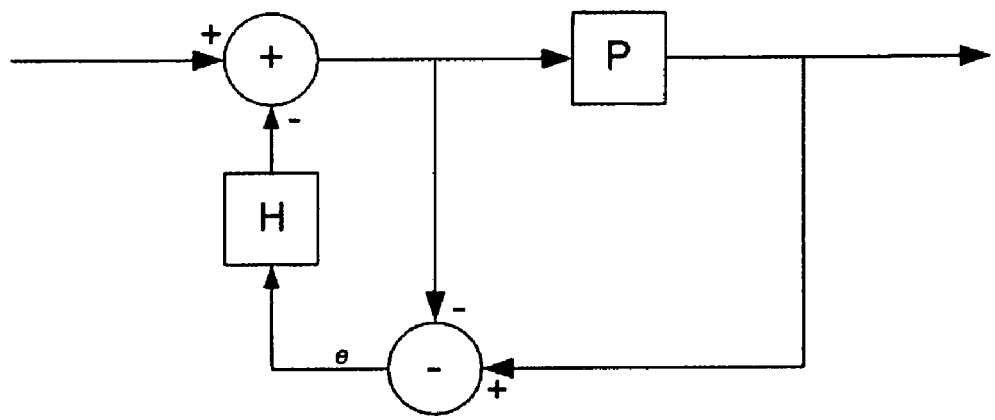
FIG. 4 shows a known system applying feedback to a plant in an inner-form topology.

The present invention provides for a feedback correction signal to be obtained by taking the difference between the output of the plant and the output of a simulator that models the plant. In the simplest embodiment of the invention, a simulator S models known aspects of the plant P, and the feedback modifies the input to the plant in response to the difference between the output of the plant and the output of the simulator. This is shown in FIG. 5, which is to be compared with FIG. 4.

Figure 5:
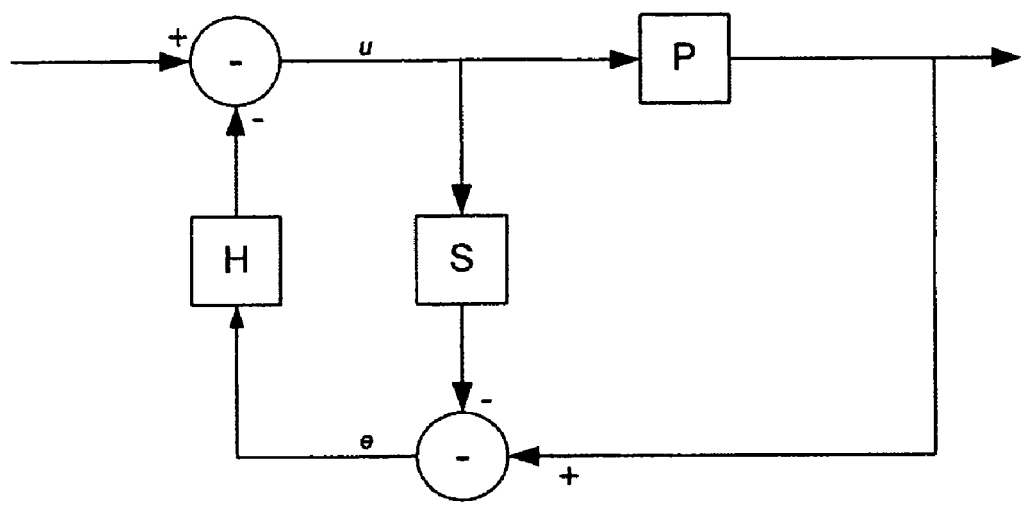
FIG. 5 shows a system employing a feedback loop according to the invention with a simulator S that models plant P.

In FIG. 5, the subtraction node at the bottom of the figure extracts the said difference as an error signal e. In this way, to the extent that S models P accurately, e will be zero. Even if e receives a perturbation because of noise or because of mismatch between S and P, and this perturbation is fed through H thereby providing a perturbation to the input u of the plant P, the perturbation to the output of P will be substantially balanced by a similar perturbation to the output of S. Therefore, the consequent further perturbation to e is either zero or small, and unlimited recirculation, i.e. oscillation, has been avoided.

Figure 6:
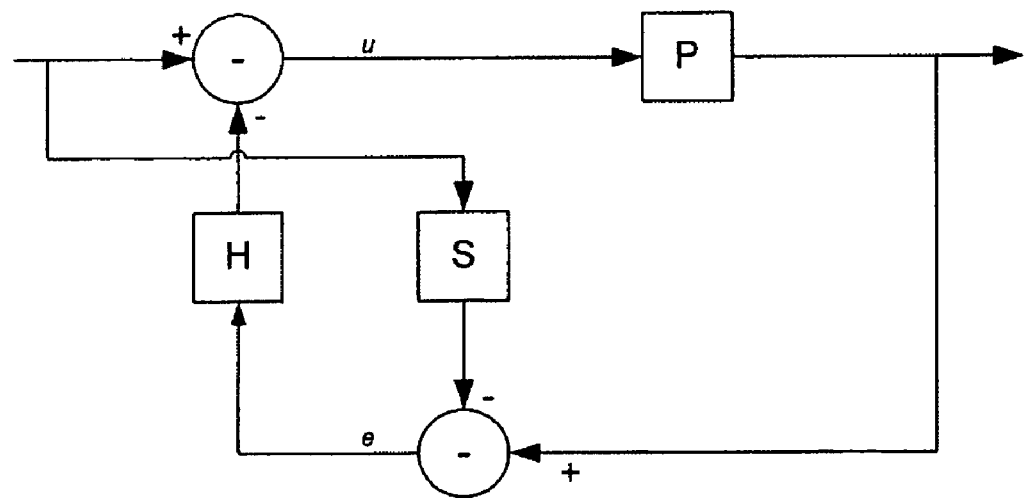
FIG. 6 shows another control system that uses a simulator.

This is the key to the stability advantage of the approach shown in FIG. 5. It is instructive to compare FIG. 5 with FIG. 6, which does not share this advantage. In FIG. 6, assuming initially that the error signal e is zero, an input signal will cause outputs from S and P that substantially balance, resulting in an error e that is again substantially zero. However, once e receives a perturbation, this perturbation propagates as a further disturbance to the output of P that is not balanced by S, so that recirculation can continue indefinitely.

Thus, in FIG. 5, only those aspects of P that are not modelled by S have the potential to cause oscillation. The reduced risk of oscillation can be traded for a more 'aggressive' filter H that provides better error cancellation over the operating frequency range, but has a higher maximum gain at other frequencies.

Reassurance about the stability of the scheme shown in FIG. 5 can be obtained if the deviation of P from S can be expressed in percentage terms, and this value can then be compared with the maximum gain of H at any frequency. For example, suppose P has an incremental gain that deviates from unity, for reasons of nonlinearity or otherwise, by 20%, and that S can model these deviations to a relative accuracy of 10%, i.e. so that the difference signal e is not more than 2% of the input u to the plant. Then, allowing for a factor of 4 stability margin, it might be considered reasonable to use a loop filter H with maximum gain 12.5 using the topology of FIG. 5. In contrast, if S were absent as in the topology of FIG. 4, then it would be necessary to restrict the maximum gain of H to 1.25 for the same stability margin.

Figure 1:
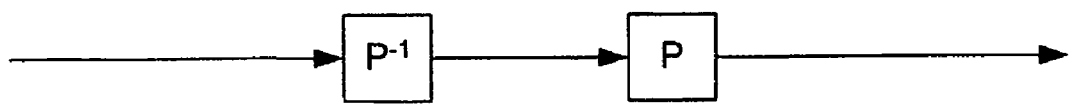
FIG. 1 shows a known system applying predistortion to a plant.
Figure 2:
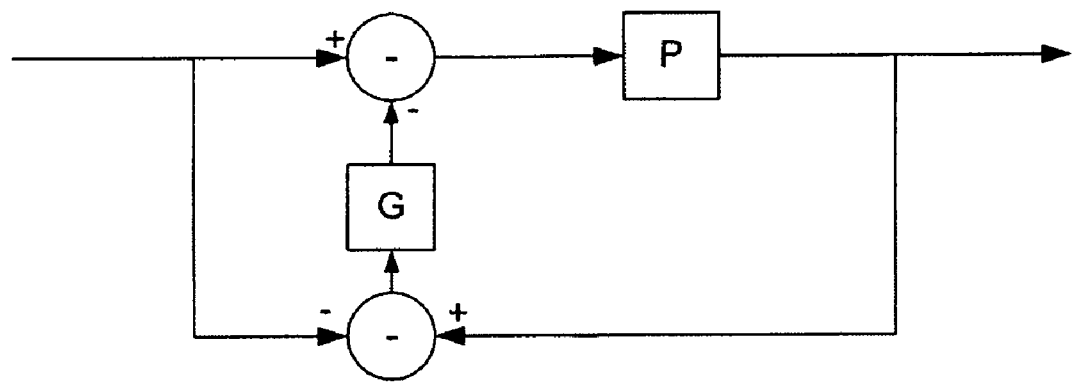
FIG. 2 shows a known system applying feedback to a plant in an outer-form topology.
Figure 7:
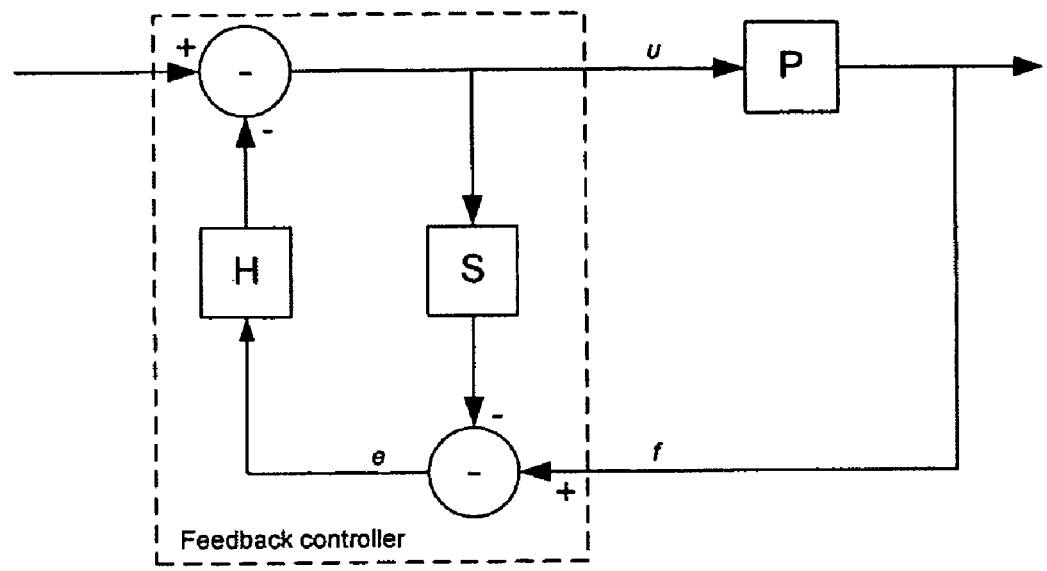
FIG. 7 shows an alternative characterisation of the feedback in FIG. 5.

If the plant P is substantially linear and the purpose of the feedback is to correct disturbances other than nonlinearities, then it will be normal to make S linear also. In this case it is instructive to consider the topology of FIG. 5 in a slightly different manner. FIG. 7 shows the topology of FIG. 5, but for descriptive purposes groups H and S into a feedback controller, as indicated by the dashed line. The feedback controller modifies the input u to the plant in response to the feedback signal f. Considering again the prior-art topology of FIG. 2, if the filter G in FIG. 2 is adjusted to have the same transfer function as the transfer function from f to u in FIG. 7, then the two topologies will have identical effect. However, it is not always straightforward to calculate the optimal transfer function G in the case of the topology shown in FIG. 2, especially if P has delay or other all-pass characteristics.

We shall now perform a small-signal analysis of FIG. 5, ignoring the nonlinearity of the plant P for the time being. We will use the symbols P, S and H to represent processing elements and also the transfer functions of those processing elements. In this case a disturbance x caused by P will cause an error signal e=x and a consequential modification −(H.x) to the input u of the plant P. This will cause a disturbance of −(P.H.x) to the output, but there will be little or no further recirculation provided that S≈P. For simplicity we now assume that S=P, so the total disturbance on the output will be (x−P.H.x).

The original error x has effectively been amplified by a factor (1−P.H), and will therefore be completely cancelled if P.H=1. In choosing H, we might naively think to use H=P$^{-1}$, but P may have a delay and or other all-pass factor and so not have a causal inverse. In that case we can write P=A.M, where A is all-pass and M is minimum-phase, and then H=M$^{-1}$ may be a reasonable choice for the transfer function. With this choice, we have P.H=A, rather than P.H=1. Now the original error x is amplified by a factor (1−P.H)=(1−A). This factor is zero at zero frequency, but becomes nonzero as frequency increases, because of the phase rotation of A, which we will denote by the function $\phi(A)$. Therefore, error cancellation will be good at very low frequencies but less good as frequency increases, and errors will be augmented when $|\phi(A)|$ exceeds $\pi/3$.

Improved error correction can be obtained over a defined operating frequency range if we choose H=M$^{-1}$.H', where H' is a prediction filter whose intention is to cancel substantially the phase rotation of A over the operating frequency range. The error amplification is now (1−P.H)=(1−A.H'), from which it is seen that we require H' to have unity amplitude but a phase of −$\phi(A)$ over the operating frequency range. Since $\phi(A)$ will be a phase lag, $\phi(H')$ must be a phase lead. It is counterproductive to make the response of H' anything other than minimum phase, and for a minimum-phase system a phase lead is associated with an amplitude response that rises with frequency. However, a rising response above the operating frequency range will cause a phase lead within the operating frequency range, and so the requirement that $\phi(H')$ must be a phase lead is not incompatible with flat amplitude response within the range.

The relationships between phase and amplitude responses for a minimum-phase system are well known, having been originally derived by Bode. In particular, the group delay or advance at DC is given by the formula:

$$\left(\frac{d}{d\omega}\phi(H(\omega))\right)\bigg|_{\omega=0} = \frac{2}{\pi}\int_0^\infty \frac{\ln\left(\frac{|H'(\omega)|}{|H'(0)|}\right)}{\omega^2}d\omega$$

where a positive value of the derivative $$\frac{d}{dw}\phi(H(w))$$

corresponds to a group advance, and consequently to a phase lead $\phi(H')$ for positive frequencies that are not too far from DC. It is clear that in order to obtain this positive derivative, the amplitude response $|H'(\omega)|$ must be greater than the response at DC $|H'(0)|$ for at least some frequencies $\omega$. It is also clear, from the factor $\omega^2$ in the denominator, that the amplitude response at low frequencies is more important than the response at higher frequencies in determining the group advance near DC.

Figure 8:
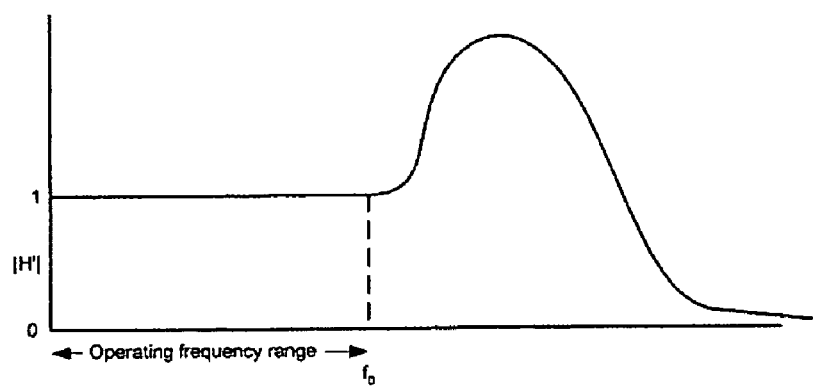
FIG. 8 shows the amplitude response |H'| of filter H' providing phase advance within the operating frequency range.

FIG. 8 shows a possible form for an amplitude response $|H'|$ of the transfer function H. It can be seen that the response is flat, or approximately flat, over an operating frequency range whose upper limit is denoted as $f_0$. The response rise above $f_0$ provides the necessary phase lead below $f_0$. At higher frequencies it may be necessary to reduce the response, for example to reduce excessive noise amplification, and it may well be necessary to reduce $|H'|$ below unity, especially if the factor M$^{-1}$ is already providing considerable boost. This reduction of $|H'|$ at higher frequencies will detract from the phase lead, and so must be judged carefully. Fortunately, the response at these higher frequencies will have less effect on the phase lead than the response just above $f_0$, as explained above.

An amplitude response of the form shown in FIG. 8 will often be adequate for many applications. However, if error cancellation to a high accuracy is required, it may be found that this form does not provide a phase curve of the right shape, having too much phase lead near $f_0$ and not enough near DC. A more elaborate amplitude response, such as a response that reduces just above $f_0$ but increases to a larger peak at some higher frequency, may then be required.

In all cases, providing phase lead will require that the amplitude |H'| is greater than unity at some frequency above $f_0$. Factors that tend to increase the required maximum gain of H' include: increased group delay associated with A, increased accuracy required of the error cancellation up to $f_0$, and increased attenuation required in H' at higher frequencies.

The previous discussion of the relationship between the gain of H and the stability of the feedback loop assumed a plant gain of unity. We may apply the same discussion to H', and in this case no longer need the assumption of a plant gain of unity, since $H=M^{-1}.H'$, and the factor $M^{-1}$ will correct for the gain of the plant. It follows from the previous discussion that a large maximum gain for H' will have an adverse effect on stability, and this must be balanced against a desire to allow a larger maximum gain in order that $\phi(H')$ may more accurately compensate $\phi(A)$ within the operating frequency range.

In addition, since the error amplification is |1−A.H'|, a value for |H'| that is substantially greater than unity at a frequency outside the operating frequency range, will imply a large error amplification at that frequency.

Figure 9:
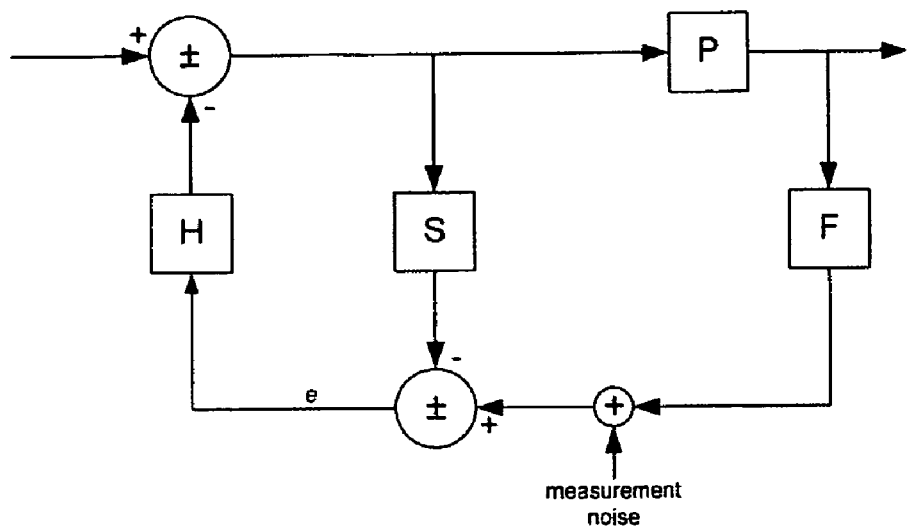
FIG. 9 shows a control system that includes a feedback measurement unit.

The control system of FIG. 5 assumes that the output of the plant P is immediately available for feeding to a signal processing element such as the subtraction node at the bottom of the figure. This would apply to a device such as an analogue audio amplifier, where tapping off a suitable feedback signal need involve nothing more that two resistors to provide attenuation. In more general cases, a transducer or measurement system may be needed, depicted as F in FIG. 9. It would be normal to ensure that F is linear, but it may have a linear transfer function that departs significantly from unity, and it may introduce measurement noise, as indicated. For simplicity we shall ignore both of these effects for the time being, but shall consider them when discussing specific applications of the invention. For the pupose of calculating H, and ignoring measurement noise, the transfer function of the feedback path F may be accounted for by including it in the assumed transfer function of the plant P.

The above remarks apply both to continuous-time (e.g. analogue) and sampled (e.g. digital) systems. In a sampled implementation, a unit delay $z^{-1}$ must appear somewhere in the loop. If this is the only all-pass element in the loop, the analysis becomes akin to the analysis of a noise shaper, and in this case there is a well-known theorem (M. Gerzon and P. G. Craven, "Optimal Noise Shaping and Dither of Digital Signals," in 87th AES, New York, (1989) preprint #2822) relating the reduction of error over parts of the frequency range to the error amplification at other frequencies. In the case of a more general all-pass element, the theorem referred to is not obeyed precisely, but the general rule still applies: a request for a greater suppression of error over one part of the frequency range leads to a larger error amplification at another frequency.

There are various ways to design the filter H, including the selection of an appropriate topology and the manual adjustment of parameters in order to obtain the required amplitude and phase characteristics. Another method, appropriate for a sampled system, is to make H a transversal filter with m taps:

$$H = \sum_{j=0}^{m-1} h_j z^{(-j)}$$

to derive equations for the $h_j$ to be solved by least squares. Specifically, the error amplification:

$$1-P.H$$

may be minimised over a number n of frequencies $\omega_i$ covering the Nyquist range. That is, we choose the $h_j$ minimise:

$$\sum_{i=1}^{n} |W_i(1 - P(\omega_i)H(\omega_i))|^2$$

where the $W_i$ are weighting factors. This is a quadratic form in the $h_j$ and can be solved by a standard procedure known in linear algebra (modified if necessary to account for the fact that the solution $\{h_j\}$ is required to be real, even though the coefficients are complex because $P(\omega_i)$ is complex). The weighting factors $W_i$ will typically be chosen to have large values for those $\omega_i$ that lie within the operating frequency range, in order to minimise the error amplification (1−P.H) over that range, and will have more moderate values at frequencies above the operating range, in order to prevent the error amplification from becoming excessive in that range.

Although in general it is useful to include the filter H, as shown in FIG. 5, in some cases an adequate cancellation of error may be obtained without the amplitude and phase correction that H provides, in which case the filter H may then be omitted from the topology.

Figure 10:
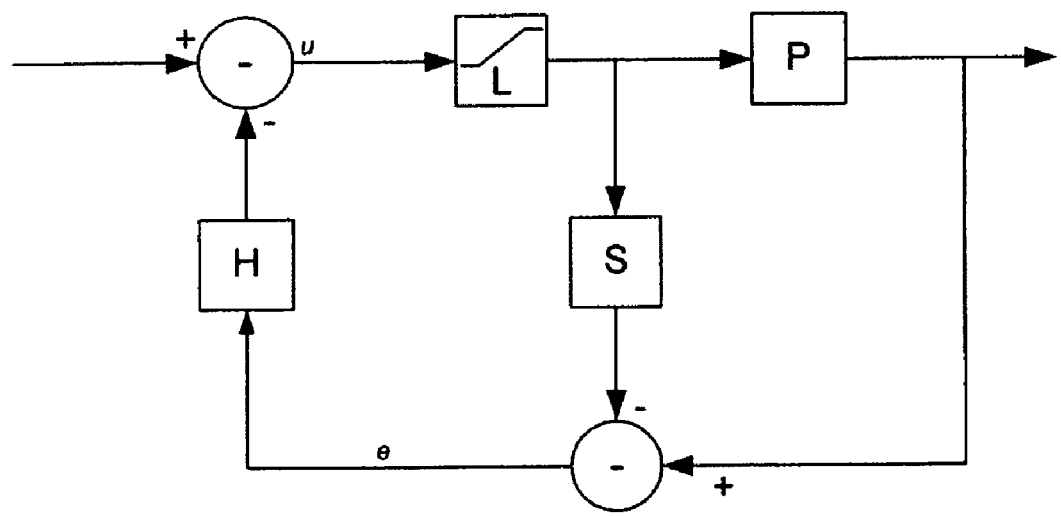
FIG. 10 shows an embodiment incorporating a signal limiting device.

Considering now overload, if the simulator S in FIG. 5 provides comprehensive simulation of the plant P, including its overload behaviour, then the error signal e should not increase wildly when the overload point is reached, unlike in a conventional feedback loop. In practice though it may be difficult to model P in the vicinity of its overload point. Moreover, a linear simulator will not model overload behaviour. Hence, it may be considered prudent to insert a signal limiting device L as shown in FIG. 10, in order to define the system overload point and ensure that the input that is provided to S and P does not exceed the range over which the simulation is accurate. Another possibility is to detect overload and to disable the feedback by breaking the feedback path at H when overload occurs.

The embodiment described above will be effective in reducing noise and other unknown disturbances introduced by P, but it does not correct the known nonlinearity of P. If P had the same response of S, then the error signal e would be zero and the system response would be that of S. If P is different from S, then to the extent that the feedback is effective, it tends to reduce the effect on the output of that difference. Therefore, the system response becomes approximately that of S.

Figure 11:
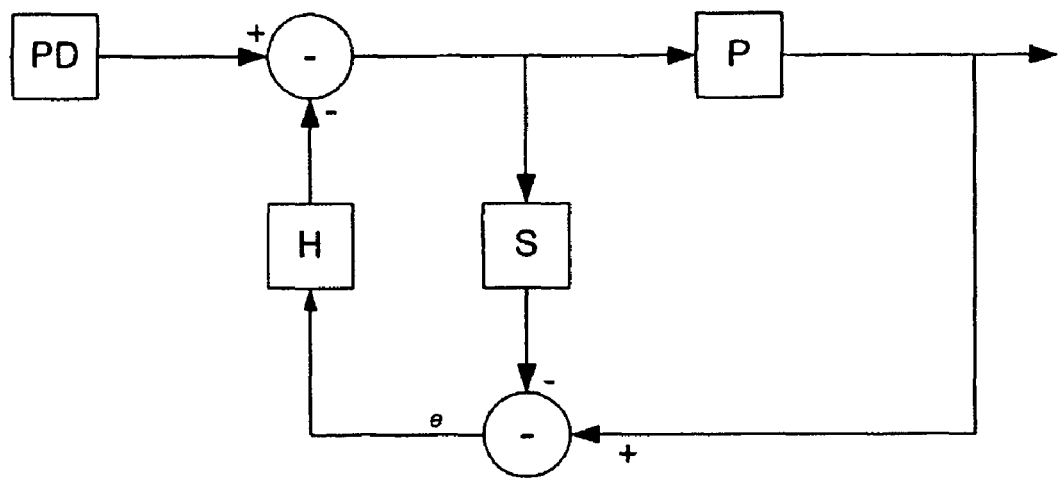
FIG. 11 shows an embodiment incorporating predistortion.

In order to linearise the system, we may use a predistortion unit PD as shown in the embodiment of FIG. 11. The intention is that PD be an approximate inverse of the plant P. Unlike $P^{-1}$ in FIG. 3, the predistortion unit PD in FIG. 11 is not in a feedback loop, and so delay in PD can be tolerated. In order to design an inverse of P using the Gerzon procedure, one or more replicas of P, or of a model of P, will be required.

Figure 12:
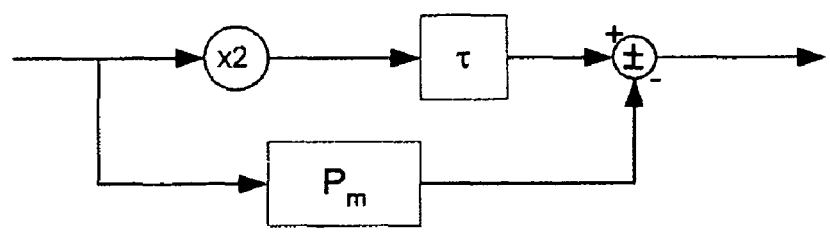
FIG. 12 shows a predistortion unit designed according to Gerzon.

For example, FIG. 12 shows a predistortion unit designed by the Gerzon method that provides first-order correction for a plant that has a weak nonlinearity and whose transfer function approximates a pure delay τ. The predistortion unit of FIG. 12 contains a forward path having an amplitude gain of 2 and a delay τ and a side-chain consisting of a model Pm of the plant whose behaviour it is desired to invert. As the simulator S in FIG. 11 is also intended to be a model of the plant, it would be extremely natural to use another copy of S within the predistortion unit in order to provide the plant model Pm. This would not necessarily be appropriate however in the context of FIG. 9, in which the simulator S is required to model a feedback path as well as a plant.

In speaking of "known" nonlinearities or other behaviour of P, the word "known" can refer to information obtained from any available source, and thus may describe characteristics that are known at design time, or are established as part of a start-up calibration procedure, or are monitored or characterised during normal operation.

At start-up, P may be characterised by feeding suitable test signals and S may be configured to model P in response to this data. Additionally or alternatively, S may be continuously adapted during operation. In either case, if an estimate of the goodness of the modelling is available, the response of H may be adjusted in response to this estimate. An improved modelling allows an H whose maximum gain is larger and hence permits better error cancellation over the operating frequency range, as compared to that previously described.

In many applications the appropriate structure for a simulator may be apparent from knowledge of the plant itself, leaving a small number of free parameters to be determined by a calibration unit or continually adjusted by an adaptation unit. Alternatively, it is possible to build a feedback controller in which the simulator models an unknown plant. A linear plant may be modelled using a Finite Impulse Response (FIR) filter, whereas a more general model such as a Hammerstein, Wiener or Volterra model may be applied in the case of an unknown nonlinear plant. The linear case using an FIR filter is particularly straightforward, and the well-known 'LMS' (least mean square) update algorithm proposed originally by Woodrow will often be adequate.

Figure 13:
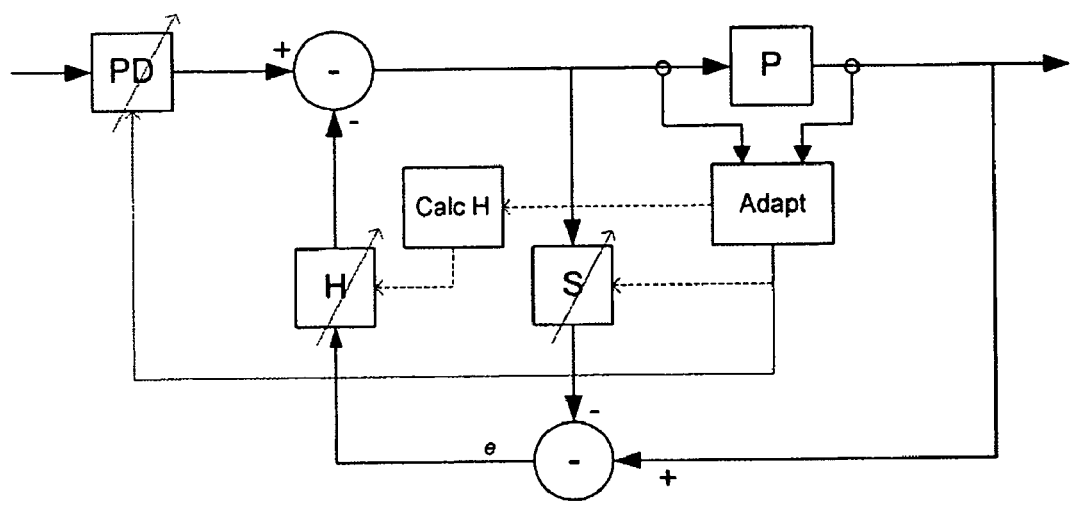
FIG. 13 shows an embodiment incorporating adaptation and predistortion.

FIG. 13 illustrates an embodiment that incorporates adaptation, in which signal paths are shown as solid lines and control paths as dotted lines. The adaptation unit characterises the plant P by monitoring its input and its output, yielding information that is used to adapt the simulator S. Alternatively, the adaptation unit could monitor the input to the plant and the error signal e, and this would be more natural if using the Woodrow 'LMS' algorithm.

Information about the adapted response of S is also passed to the calculation unit, which computes a suitable filter H using principles such as those already described. Some of the information may relate to the small-signal amplitude and phase responses of S, which are to be substantially compensated by H within the operating frequency range. As already mentioned, the information might include an estimate of the goodness of the adaptation, so that a bound can be set on the magnitude response of H outside the operating frequency range. In particular, H will probably be set to zero at initialisation, so that there is no feedback until reasonable balance between S and P has been achieved.

The embodiment shown in FIG. 13 also incorporates the predistortion feature of the system shown in FIG. 11. Control information is passed from the adaptation unit to the predistortion unit PD so that PD can track changes in S and thereby changes in the plant P. If PD is implemented using the Gerzon technique as described above using one or more replicas of the simulator S, then correct tracking of PD can be obtained simply by ensuring that the replicas of S that are internal to PD are adapted to follow the changes to S itself.

With reference to FIG. 5, we have explained how accurate modelling of P by S can ensure feedback stability, even under large signal conditions, but in describing how to design H for effective error cancellation we have assumed linearity. Hence, in the nonlinear case there is the likelihood that error cancellation will become less effective at higher signal levels. Feedback would retain more of its effectiveness at high levels if some of the nonlinearity of P could be corrected before feedback is applied. The schematic of FIG. 14 illustrates partial correction of the nonlinearity in P by means of a low-delay corrector (LDC), resulting in a corrected plant P' that is in some sense more linear than P, thereby retaining the effectiveness of the feedback at high levels, at least over the operating frequency range.

Figure 3:
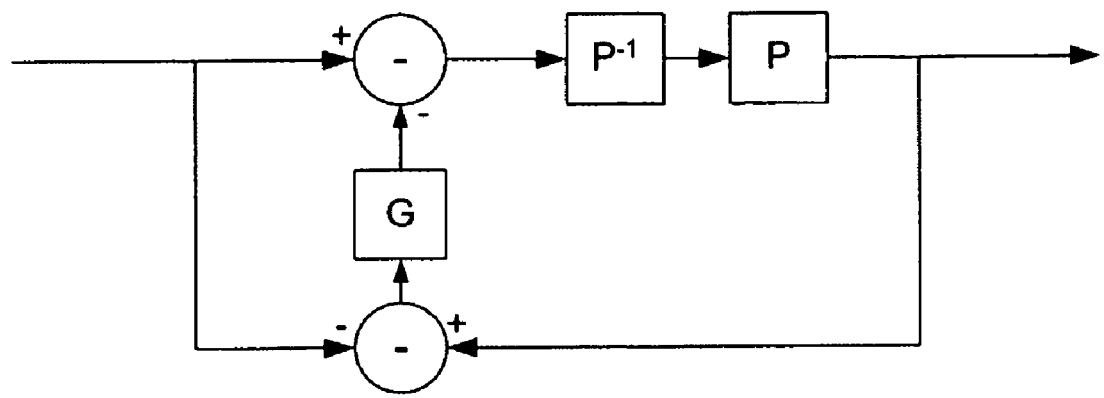
FIG. 3 shows a known system applying a combination of predistortion and feedback to a plant.

Potential difficulties in correcting a plant's response within a feedback loop have been discussed in relation to FIG. 3, with increased delay being cited as a particular problem. In the system shown in FIG. 14 we are aiming to achieve approximate correction; moreover it may be adequate to employ correction that is effective only over the operating frequency range. There are cases in which pre-correction cannot reduce a plant's nonlinearity at all frequencies without introducing delay, but in which nonlinearity can be reduced over a limited frequency range by a corrector that has low delay or even no delay at all. In these cases the low-delay corrector can be used as the LDC shown in FIG. 14.

Figure 14:
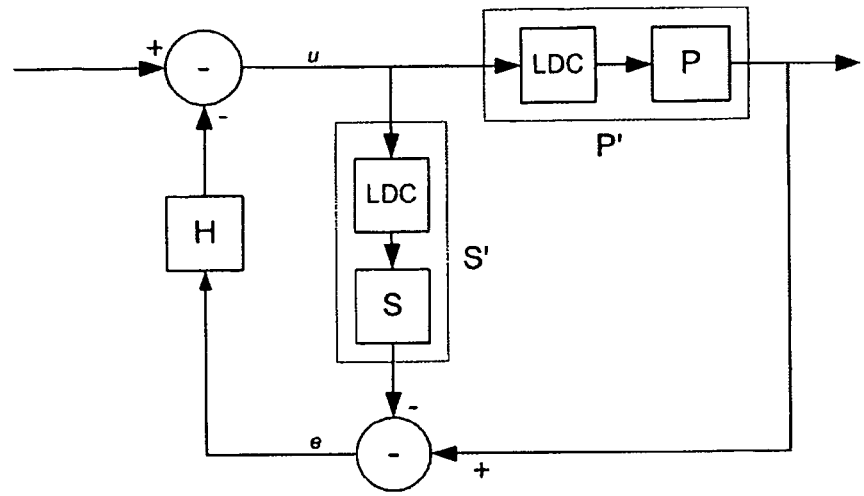
FIG. 14 shows a feedback loop according to the invention, incorporating low-delay correction.

The simulator S' in FIG. 14 models the functional behaviour of the partially corrected plant P' and can be designed without reference to the internal structure of P'. Alternatively, it can have an internal structure similar to that of P', i.e. starting with an LDC sub-unit, as shown in FIG. 14. It will be apparent in the latter case that the two instances of LDC can be merged, as shown in FIG. 15.

Figure 15:
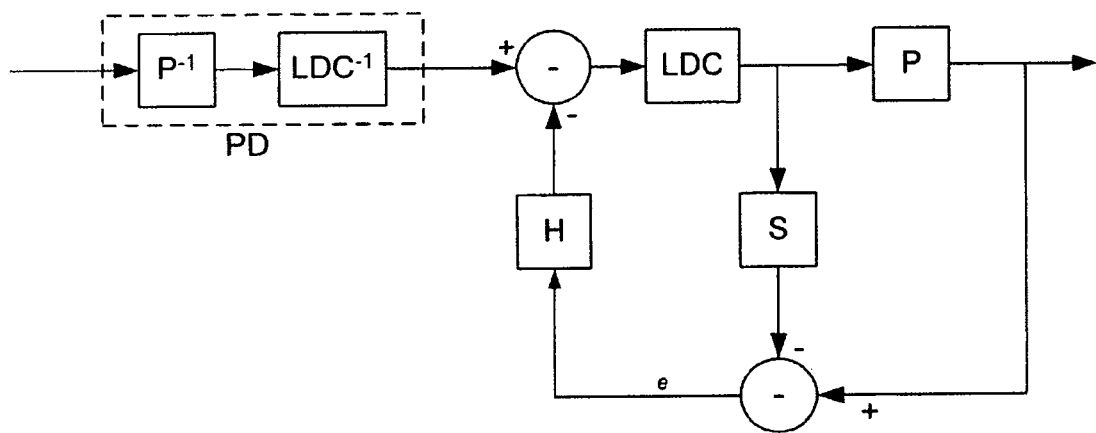
FIG. 15 shows an embodiment including low delay corrector LDC and predistortion unit $S'^{-1}$.

The system shown in FIG. 15 also incorporates a predistortion unit PD, whose function is to invert the combined response of LDC and P. Once again there is a choice about internal structure, and FIG. 15 depicts PD as containing separate subunits $LDC^{-1}$ and $P^{-1}$ to compensate LDC and P respectively. This structure may be advantageous if LDC is straightforwardly invertible. Alternatively, it is possible to design PD to invert the cascaded combination of LDC and P as a whole, for example using the architecture of FIG. 12 in which $P_m$ is a model of that combination.

If the corrector LDC contains delay, the amount of small-signal feedback that is obtainable (having regard to the constraints on the design of H) will be reduced, and this disadvantage will have to be weighed against the benefit of more consistent performance at higher levels. It is ideal if the small-signal behaviour of LDC can be that of a minimum-phase filter.

Figure 16:
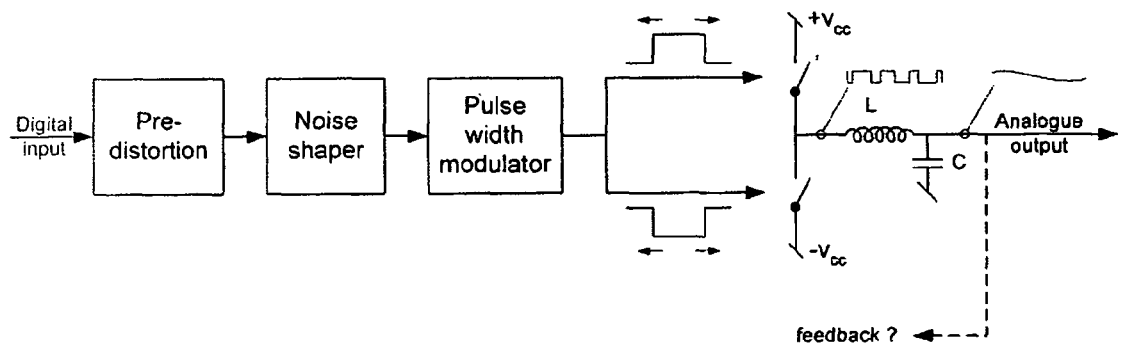
FIG. 16 shows a known digital pulse-width-modulated (PWM) amplifier.

As will be appreciated, the present invention may be used in a wide range of applications, including audio electronics. FIG. 16 shows a prior art digital power amplifier employing Pulse Width Modulation (PWM). Detailed information the amplifier may be found in Harris, S., Andersen, J., and Chieng, D., "Intelligent Class D Amplifier Controller Integrated Circuit as an Ingredient Technology for Multi-Channel Amplifier Modules of Greater than 50 Watts/Channel" presented at the AES 115th Convention 2003 Oct. 10-13 New York, Audio Eng. Soc. preprint #5947. In the amplifier, a digital audio signal, sampled at a high rate such as 384 kHz, is fed to a predistortion unit, and then to a noise shaper, which quantises the signal to a lower resolution such as 256 levels. A pulse width modulator then generates a pulse for each signal sample, the pulse length being proportional to the quantised signal. In the case illustrated, known as "class AD modulation", the rising and falling edges of the pulse are moved in opposite directions in response to the signal, as indicated by the arrows in FIG. 16.

The modulated pulses are then used to control power switches. In a typical implementation two MOSFETS will be driven in antiphase so that their junction is connected alternately to the power rails $+V_{cc}$ and $-V_{cc}$ and thereby carries a high level PWM waveform whose mark-to-space ratio is modulated by the signal. This waveform is applied to an output filter consisting of an inductor L and a capacitor C. The filter removes most of the energy at the original sampling rate and its harmonics, leaving a smooth analogue waveform as shown, which can be fed to a load such as a loudspeaker.

Substantial problems confront the person who would think to place most or all of the elements shown in FIG. 16 within a feedback loop. Firstly, as the output is analogue but the input is digital, an ADC (analogue-to-digital converter) will be needed. As it is desired to keep delay to a few microseconds, a special type of ADC is needed. Another difficulty that is often cited is the LC filter, which introduces a phase shift of nearly 180° above its resonant frequency, which is typically around 40 kHz. If the response of the LC filter were accurately known, then it would not present a fundamental problem, as it is minimum-phase and could be compensated somewhere else within the feedback loop. However, the response is determined partly by the load, which is not known a priori and may vary during operation. To avoid the LC uncertainties we shall consider the case where the feedback is taken from the power switches, just prior to the LC filter, as such feedback still provides a useful improvement.

Even with a specially designed fast ADC, it is still difficult to achieve a loop delay lower than 5 μs-10 μs. A delay of 10 μs corresponds to a phase shift of 72° at 20 kHz, and in order to obtain substantial feedback over the 0-20 kHz frequency range using prior art methods one would probably be forced to consider a "conditionally stable" design. In such a design, the phase is allowed to exceed 180° at some frequencies at which the (modulus of) loop gain is greater than unity, but the phase must be brought down to less than 180° when the loop gain makes the transition from being greater than unity to being less than unity.

Figure 17:
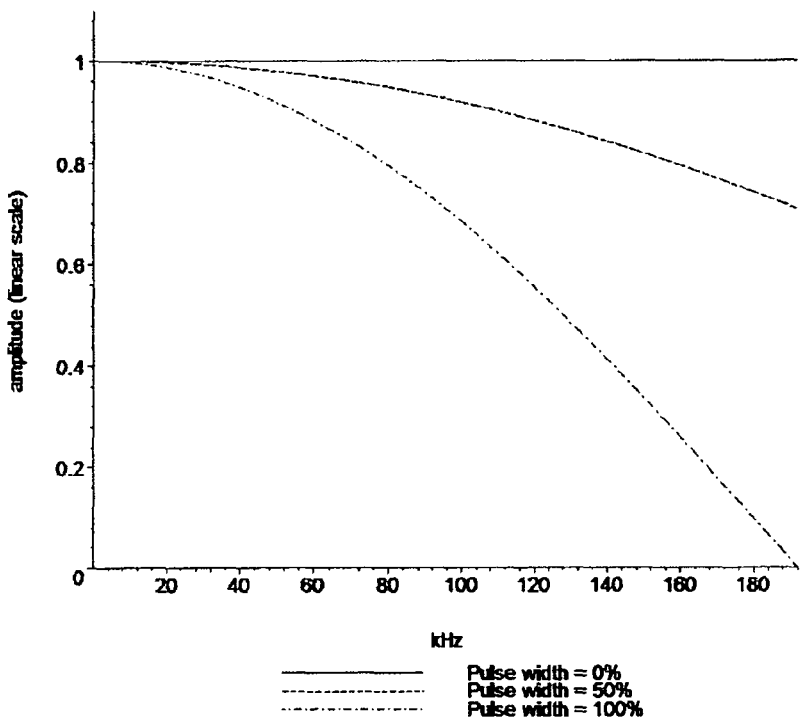
FIG. 17 shows the small-signal amplitude response of a double-edge (class AD or class BD) PWM modulator operating at 384 kHz, with pulse width as parameter.

If overload considerations can be handled, a conditionally stable feedback loop can be satisfactory in the context of a linear, or almost linear, system. However, the pulse width modulation process is nonlinear, and in the case of double-edge modulation the transfer function is flat in the limit as the pulse length tends to zero, but shows an increasing high frequency droop as the pulse length increases. This behaviour is illustrated in FIG. 17. The amplitude response at the Nyquist frequency (192 kHz in the case illustrated) tends to zero as the pulse length tends to 100% of the repetition period. This implies that a conditionally stable feedback loop that is stable at zero pulse length is likely to have stability problems as pulse length increases.

Figure 18:
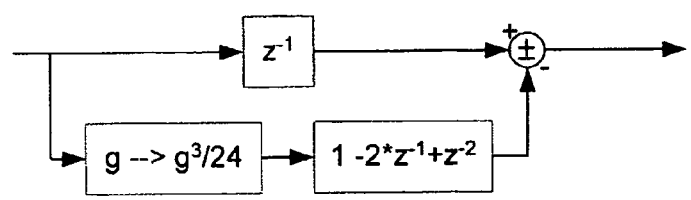
FIG. 18 shows a known approximate correction for PWM nonlinearity.

It is instructive to consider how this nonlinearity might be compensated, in the hope that it will be easier to apply feedback around a partially linearised system, as discussed earlier in relation to FIG. 3. A prior art corrector for the PWM nonlinearity is shown in FIG. 18. The signal processed by the corrector represents pulse length, and takes the value 0.5 when the pulse length is 50% of the repetition period. The corrector comprises a main path having a delay $z^{-1}$ of one sample period, and a side-chain consisting of a cubic nonlinearity followed by a sampled approximation to a double differentiation.

Unfortunately, if the corrector of FIG. 18 is used as the predistortion unit $P^{-1}$ in the prior art topology of FIG. 3, the delay in the main signal path of FIG. 18 will cause increased loop delay, making application of feedback more difficult. Moreover, although the predistortion unit of FIG. 18 will substantially compensate the PWM nonlinearity of FIG. 17 over an operating frequency range such as 0-20 kHz, it is powerless to compensate the behaviour of FIG. 17 as the pulse length approaches 100% and the frequency approaches the Nyquist limit, because to do so would require infinite gain in the predistortion unit.

Figure 19:
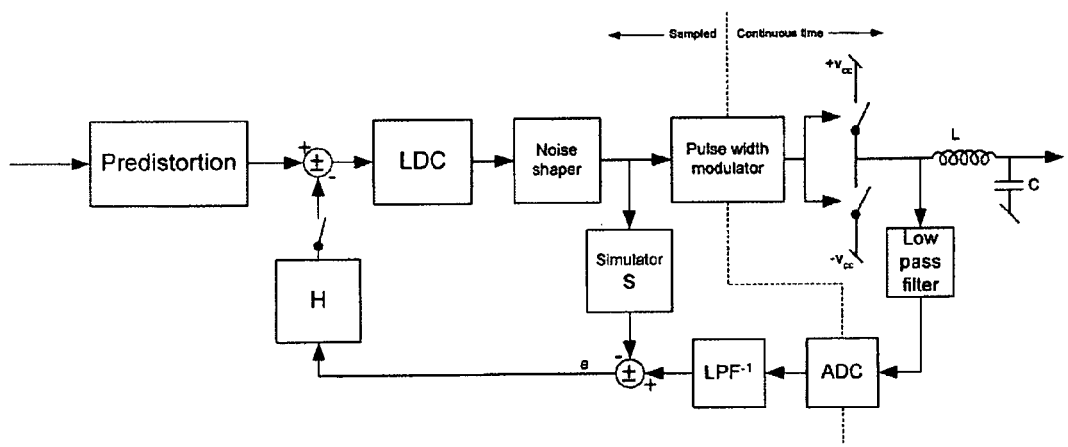
FIG. 19 shows a digital PWM amplifier including feedback according to the invention.

FIG. 19 shows a digital PWM amplifier that embodies several aspects of the invention. Items to the left of the dashed line are conventional digital audio signals sampled at, for example, 384 kHz. Items to the right of the line are continuous time signals.

As suggested above, the signal for the feedback is taken from the output of the power switches. In making the transition from the continuous-time domain to the discrete-time domain, the ADC will perform a sampling operation, and a low pass filter is needed to prevent high frequency components of the switch output from aliasing with the sampling process and thereby corrupting the digital representation of the output audio signal. If an oversampling design of ADC is used, for example digitising firstly at 6.144 MHz and then decimating by a factor 16 to produce the output at 384 kHz, then the aliasing at each stage needs to be considered. In this design two filters are involved, namely the analogue low-pass filter shown in FIG. 19 and a decimation filter (not shown) that is conceptually part of the ADC. Ideally, each filter should be minimum phase, and each should attenuate as much as necessary for alias rejection but not more so, for additional high frequency attenuation necessarily incurs extra group delay in the baseband frequency range 0-192 kHz. Conventional "comb filters" are not ideal, and certainly the usual type of FIR band-limiting filter that is used to provide a digital audio output should not be used.

It is not necessary for the filtering just described to have a flat response within the baseband 0-192 kHz, as any deviation or droop can be corrected either in the filter $LPF^{-1}$ or later in H. However excessive droop in the analogue filter should be avoided, as its correction will require boost that will also boost high frequency noise produced by the ADC. If the analogue low-pass filter is of the infinite impulse response (IIR) type, then it may be convenient to use $LPF^{-1}$ to render the impulse response finite, using zeroes of the transfer function of $LPF^{-1}$ to cancel the poles of the low-pass filter. There are several ways to obtain the desired result, which is that the output of $LPF^{-1}$ be a representation of the output of the switches, accurate within the operating frequency range except for known filtering, added noise and the like.

Figure 20:
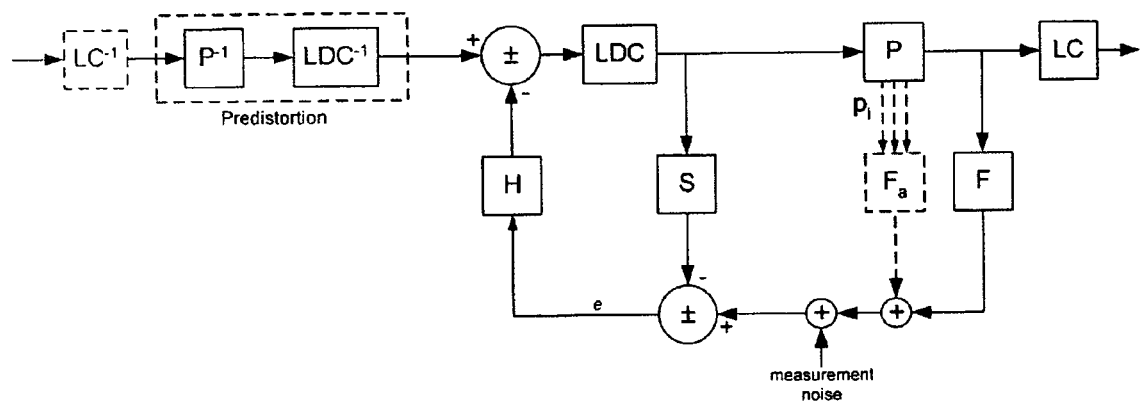
FIG. 20 shows a signal path representation of a digital PWM amplifier according to the invention.

FIG. 20 shows a conceptual model of the signal path of FIG. 19. The pulse width modulator and the power switches in FIG. 19 are represented by the plant P in FIG. 20. The transfer function of the low pass filter, ADC and $LPF^{-1}$ in FIG. 19 are represented by the feedback path F, which is assumed to be a linear filter, in FIG. 20. Application of the invention to a feedback path that includes filtering has already been discussed in relation to FIG. 9, and much of that discussion is relevant to FIG. 19 also.

It is intended that FIG. 20 be interpreted entirely as a sampled system. However, FIG. 19 shows a mixture of sampled and continuous time processing, and it is necessary to define how the continuous time signals in FIG. 19 are mapped on to their sampled counterparts in FIG. 20. We shall perform this mapping by matching baseband spectra. That is, the sampled representation of a continuous-time signal is defined as the sampled signal that has the same frequency components, up to its Nyquist frequency, as the continuous-time signal. It is conventional to measure the performance of a PWM amplifier though a steep lowpass filter, for example at 20 kHz, so that components about the Nyquist frequency, for example 192 kHz, are certainly not included in the measurement. However, for an accurate modelling of the amplifier we cannot ignore them, because the pulse width modulator emits strong energy above the Nyquist frequency, concentrated particularly at and near harmonics of the switching frequency. Although these harmonics are attenuated by the various lowpass filters, they are not reduced to zero and will alias in the ADC to produce an ADC output. Therefore, in FIG. 20, the feedback path though F is intended to represent the feedback of information that, in the analogue domain, is carried in the baseband frequency range, while the path through $F_a$ is intended to represent the effect of aliased components. The path from P to $F_a$ is shown as a multiplicity of dashed lines to emphasise that the signal $p_i$ represents a multiplicity of images of the baseband that are aliased and combined in $F_a$.

Also shown in FIG. 20 is "measurement noise", representing noise introduced by the ADC. The output filtering performed by L and C in FIG. 19 is represented by LC in FIG. 20, and an optional correction filter $LC^{-1}$ is also shown. As the filter LC is outside the feedback loop, we shall not consider it further. Thus, we consider the design aim to be to make the output of P an accurate replica, over the operating frequency range, of the input of the predistortion unit.

The previous discussions of the design of S, H and the predistortion need to be modified to take account of the extra complexity introduced in FIG. 20. The simulator S models not just the plant P but also the feedback path F and, ideally, the effect of the aliased images $F_a.p_i$ also, so that once again the error e will be zero (apart from noise) if the plant behaves according to its model. In designing H, the aliased images can generally be ignored, but it is necessary to take into account the transfer function of F, and the amplification of measurement noise also needs to be considered. The predistortion should correct for the combination of LDC and P, rather than for the combination of LDC and S.

In more detail, the simulator S is designed to model the response of the Pulse Width Modulator, the power switches, the low-pass filter, the ADC and $LPF^{-1}$. Both linear and nonlinear aspects need to be modelled, in order to ensure that the subtraction error e be as small as possible during normal operation. We shall assume that the only nonlinear aspect that need be modelled is the intrinsic nonlinearity of pulse width modulation. We shall present two approaches to the design of S, the first and simpler one ignoring the aliased images, and the second approach accounting fully for them.

Figure 21:
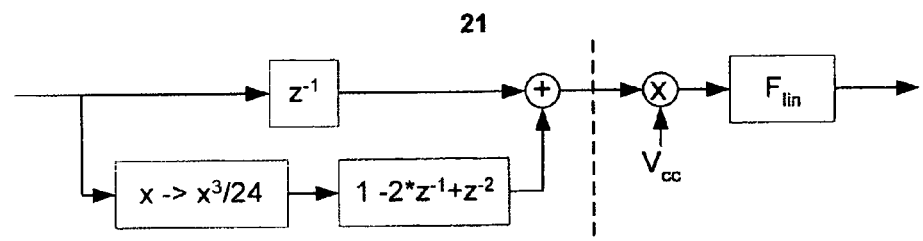
FIG. 21 shows a simple simulator for use in a PWM amplifier.

FIG. 21 shows the simpler simulator. To the left of the dotted line is a nonlinear element that provides a first order approximation to the baseband nonlinearity introduced by a double-edge PWM modulator. The similarity with the compensator of FIG. 18 will be obvious, the difference being a sign reversal. The input x to this nonlinear element represents pulse length as a proportion of the pulse repetition period. To the right of the dotted line is a multiplication by the power supply voltage $V_{cc}$, followed by linear filtering by the filter $F_{lin}$.

Figure 22:
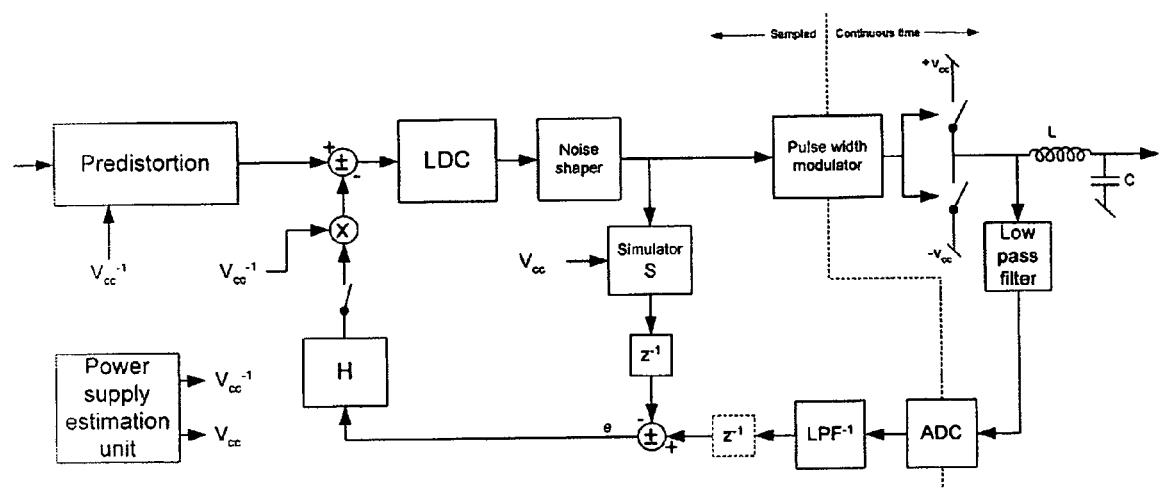
FIG. 22 shows a digital PWM amplifier according to the invention incorporating estimation of the power supply voltage and additional delay elements.

The multiplication by $V_{cc}$ represents the fact that the signal gain of the power switch is directly proportional to the power voltage. Either this gain must be known accurately in advance, or an estimate must be derived by a power supply estimation unit and fed to the simulator as shown in FIG. 22. The power supply estimation unit may monitor the power supply voltage using an ADC, or it may use an adaptation principle as previously discussed with reference to FIG. 13.

$F_{lin}$ in FIG. 21 corresponds to F in FIG. 19: thus it models the linear response of the output switches, the low pass filter, the ADC and $LPF^{-1}$. $F_{lin}$ could reasonably be a transversal (FIR) filter whose coefficients are determined using any of the known methods of linear system identification and FIR approximation.

There are some delay complications relating to $F_{lin}$ because a typical PWM modulator incurs a delay of half a pulse repetition period, whereas the nonlinear element in FIG. 21 reduces to $z^{-1}$, i.e. a delay of a whole repetition period, as x tends to zero. It is further helpful or necessary that $F_{lin}$ incorporate a $z^{-1}$ element in order to avoid a delay-free feedback loop thorough the simulator. Standard techniques can approximate the required response despite these delay constraints, but because of them and because FIG. 21 provides only an approximate simulation it may be preferred to employ the more advanced procedure that will now be described.

We now consider the more advanced simulator that takes account of the aliased images, i.e. of the signal path through $F_a$ in FIG. 19. The analogue output of the pulse width modulator contains strong harmonics of the switching frequency, each harmonic carrying a different nonlinear modulation of the audio signal. The linear filtering that is applied before these harmonics are aliased back to the baseband the proportion in which the nonlinear terms contribute, and therefore affects the nonlinear behaviour of the system that is being simulated.

Accordingly, a precise specification is needed for the low-pass filter in FIG. 19, for $LPF^{-1}$ and for the filtering performed by the ADC. We shall consider an example in which the analogue lowpass filter is a second order all pole filter with transfer function:

$$\frac{1}{(1-\tau s)^2}$$

where s is the Laplace transform variable and $\tau=4$ µs. The digital filter $LPF^{-1}$ that has two zeroes to cancel the two poles of the analogue filter has the z-domain representation:

$$LPF^{-1}=4.36757-4.55540.z^{-1}+1.18783.z^{-2}$$

assuming a sampling frequency of 384 kHz.

Figure 23:
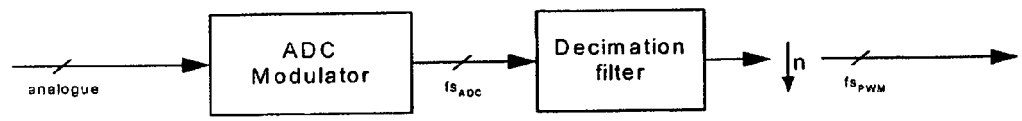
FIG. 23 shows a known oversampled ADC.
Figures 24, 25:
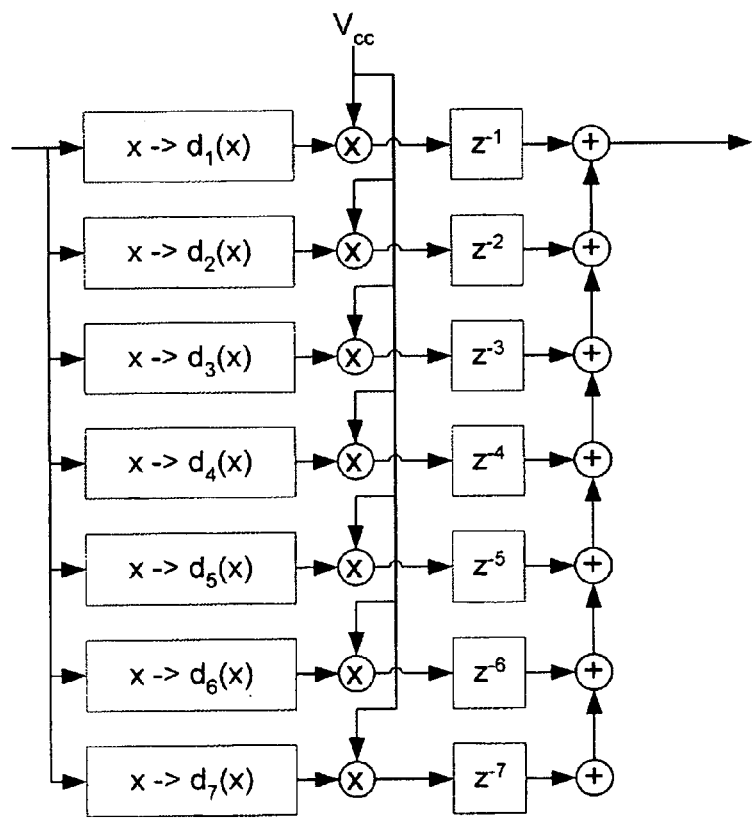
FIG. 24 shows coefficients of a minimum-phase decimation filter designed for use in an oversampled ADC.
FIG. 25 shows a more accurate simulator for use in a PWM amplifier.

In principle an ADC need not perform filtering but current high quality audio ADCs operate on an oversampling principle and require a decimation filter. We shall assume the ADC structure shown in FIG. 23, comprising a modulator, a decimation filter and resampler. We assume that the modulator behaves as an instantaneous sampler at the frequency $fs_{ADC}$, for example 6.144 MHz. The output rate $fs_{PWM}$ is equal to the PWM pulse repetition rate of 384 kHz in this example. The resampler allows one sample in n to pass, where n is the decimation ratio $fs_{ADC}/fs_{PWM}$ which is 16 in this example. We consider the decimation filter to be an 80-tap FIR filter with response:

$$\sum_{j=0}^{79} tap_j zz^{(-j)}$$

where the coefficients $tap_j$ are tabulated in FIG. 24 and where zz represents unit delay at the oversampling frequency $fs_{ADC}$. Thus, the decimation filter operates conceptually at $fs_{ADC}$ but, because of the resampling, it need be evaluated only at the lower rate of $fs_{PWM}$.

Analysis reveals that, because of the pole-zero cancellation between the analogue lowpass filter and $LPF^{-1}$, and because the decimation filter is FIR, the response of the entire system that is being modelled (from pulse width modulator through to $LPF^{-1}$) is finite duration. Thus each sample input to the pulse width modulator affects only a finite number of samples output from $LPF^{-1}$. In this case, the number of samples affected is seven. Further, each sample is treated independently by the pulse width modulator and subsequent processing is linear. This suggests the simulator structure of FIG. 25, in which the nonlinear function $d_1(x)$ represents the dependence of the output at the next sample instant on the current pulse width x, $d_2(x)$ represents the dependence at the next-but-one sample instant and so on.

Figures 26, 27:
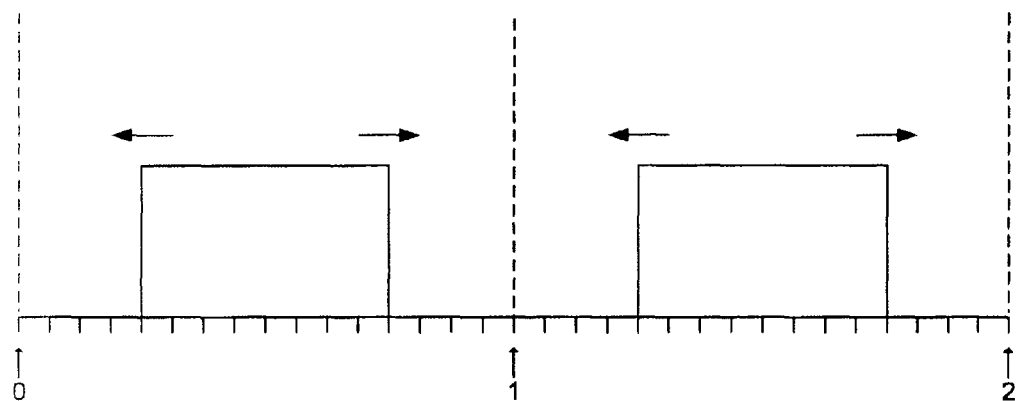
FIG. 26 shows the timing relationships between PWM pulses and sampling instants.
FIG. 27 shows coefficients of a filter H for use in a PWM amplifier.

To make further progress we need to be precise about the timings of the ADC sampling instants and the resampling instants. FIG. 26 shows two PWM pulses, each centred within a conceptual frame of length one repetition period bounded by the vertical dotted lines. The figure illustrates the case x=0.5, i.e. each pulse is of length 50% of the frame. The most straightforward situation occurs when each resampling instant coincides with a sampling instant and also with a frame boundary. In FIG. 26 the resampling instants are labelled 0, 1 and 2, and the small tick marks on the horizontal axis represent ADC sampling instants, which occur 16 times as often.

If the oversampling ADC were replaced by an ADC that samples instantaneously at the frame boundaries 0, 1, 2 etc., it would be easy to visualise the operation as a convolution of each PWM pulse by the impulse response of the analogue lowpass filter:

$$\begin{cases} 0 & t<0 \\ \dfrac{te^{(-\frac{t}{\tau})}}{\tau^2} & 0 \leq t \end{cases}$$

followed by the sampling. This impulse response has a discontinuity of gradient at t=0, but is analytic, i.e. smooth, elsewhere. Provided x<1, the PWM pulse edges will not cross the frame boundaries. Therefore the value that is sampled at a frame boundary will also be a smooth function of x.

With the oversampling type of converter, this situation does not obtain precisely. Nevertheless, with a suitable design of decimation filter, such as that tabulated in FIG. 24, each output value of the ADC, and therefore also of $LPF^{-1}$, is, to an adequate degree of approximation, a smooth function of the x values that were applied at previous sample instants.

It follows that the functions $d_1(x)$ that are required in the simulator of FIG. 25 are also smooth, and we find by least-squares polynomial approximation:

$d_1(x) = 0.0819616\, x + 0.0408626\, x^3 + 0.0011542\, x^5$ $d_2(x) = 0.8066498\, x - 0.0849205\, x^3 - 0.0056800\, x^5$ $d_3(x) = 0.0438820\, x + 0.0533158\, x^3 + 0.0114638\, x^5$ $d_4(x) = 0.0784520\, x - 0.0229539\, x^3 - 0.0122444\, x^5$ $d_5(x) = -0.1146495\, x + 0.0269429\, x^3 + 0.0073815\, x^5$ $d_6(x) = 0.0921093\, x - 0.0188471\, x^3 - 0.0024272\, x^5$ $d_7(x) = 0.0115946\, x + 0.0056019\, x^3 + 0.0003500\, x^5$

The coefficients of the even powers of x are zero because of the symmetry caused by the leading and trailing edges of each pulse moving in opposite directions.

Using these polynomial approximations, the simulator of FIG. 25 provides an accurate simulation of the nonlinearity of the pulse width modulator, the gain modulation by the power supply voltage $V_{cc}$, and the subsequent filtering. Each path in the simulator includes at least one unit delay $z^{-1}$, reflecting the causality of the analogue system that it models and also making possible its incorporation in the topology of FIG. 19 without creating a delay-free feedback path. However, the timing model discussed above may present an implementation difficulty which we shall not discuss in detail, but is connected with the face that no time has been allowed for propagation delays, computational delays and the like. In order to address this problem an additional $z^{-1}$ elements may be inserted as shown in FIG. 22. A delay element appears explicitly in the simulator path. A delay element is shown also the signal path containing the ADC, but it is not intended that this ADC delay be implemented as a single unit. Rather it indicates timing slack, some of which can be distributed over various elements in the signal path that includes the pulse width modulator, power stages, and ADC. The remaining timing slack can cover the computational delay in the digital signal processing unit that implements the remainder of the feedback loop. Nevertheless, for the purpose of transfer function analysis, a single delay element can be assumed to follow the $LPF^{-1}$ element as shown.

We now consider the design of the filter H. We have previously described a design procedure based on a least-squares minimisation of the error amplification which, referring to FIG. 5, was (1−P.H). To accommodate the effect of the feedback path F in FIG. 19, the transfer function P in the previous discussion should be replaced by P.F, so the error amplification to be minimised is now (1−P.F.H).

The effect of H on the measurement noise shown in FIG. 19 should also be considered. Some oversampling ADCs have a noise spectrum that rises strongly (for example, at 18 dB/8 ve) above 30 kHz, and such noise is further increased by $LPF^{-1}$ in FIG. 22. This amplified ultrasonic noise may reduce the headroom available for signal and may also intermodulate with the noise that is produced by the noise shaper in FIG. 22, to produce components at audio frequencies. This amplification may be controlled by a penalty function, so that the quadratic form that has to be minimised is now:

$$\left(\sum_{i=1}^{n} |W_i(1 - P(\omega_i)F(\omega_i)H(\omega_i))|^2\right) + \left(\sum_{j=1}^{q} |N_j H(\omega_j)|^2\right)$$

where $N_j$ is a noise weighting factor that is adjusted to control the measurement noise at each of the q frequencies $\omega_i$. It would be reasonable to make $\{\omega_i\}$ equally spaced over the Nyquist range, and to choose $N_j$ to be proportional to the amplitude spectrum of the ADC noise, as modified by the decimation filter and $LPF^{-1}$.

Figure 28:
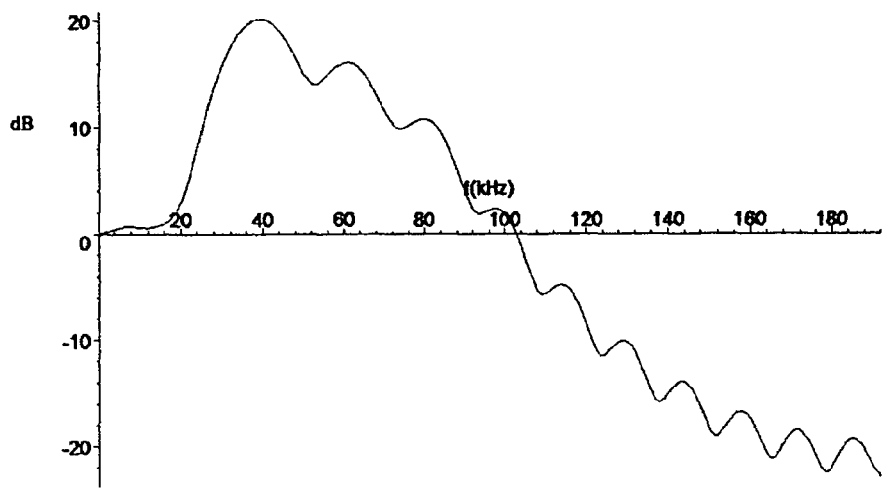
FIG. 28 shows an example of the amplitude response of filter H, implemented as 25-tap FIR.

Proceeding as above and with a filter of length 25 we obtain a filter H whose coefficients $h_i$ are tabulated in FIG. 27 and whose amplitude response curve is shown in FIG. 28. As described in relation to FIG. 8, a rise in amplitude response above 20 kHz allows a phase advance is achieved in the range 0-20 kHz, amounting to a time advance (i.e. negative of group delay) of 3.125 samples near DC. This advance substantially compensates the delay of the simulator, which is 2.2 samples, plus the additional $z^{-1}$ element following the simulator.

Above the peak at 39 kHz, the response falls, largely as a result of the penalty function with weighting factors $N_j$ that was used to control the ADC noise.

The least-squares formulation leads directly to the design of H: it is not in general necessary to decompose H as $H=H'.M^{-1}$ as discussed previously, where M represents the minimum-phase component of the plant or of P.F. However, if the power supply voltage $V_{cc}$ may vary, then this variation, which is logically part of M, needs to be accounted for explicitly, which can be done by multiplying the output of H by $V_{cc}^{-1}$ as shown in FIG. 22. (For simplicity we have assumed that the nominal value of $V_{cc}$ is unity, but the skilled person will be able to adjust scalings of $V_{cc}$ and other quantities according to the convenience of the implementation.)

With reference to FIG. 22, feedback can be enabled or disabled by closing and opening the switch that follows H. The switch will in practice be a "soft" switch, and if desired it can be placed before H rather than afterwards.

Figure 29:
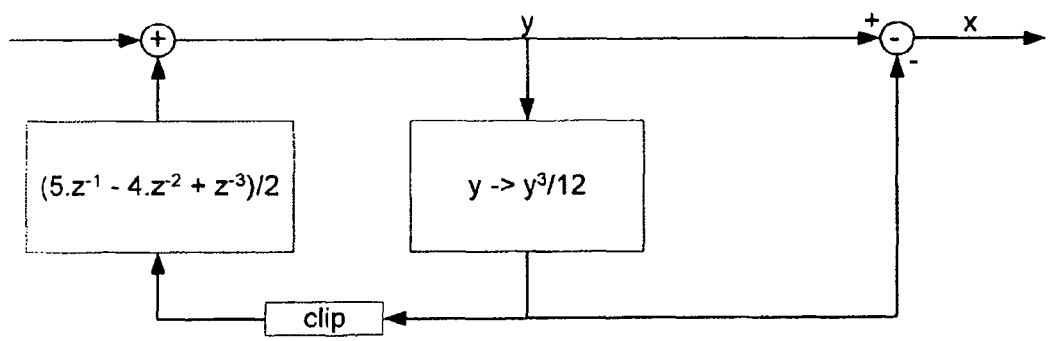
FIG. 29 is a schematic of a low delay corrector unit LDC.

As described with reference to FIG. 15, a low delay corrector LDC is provided to improve the effectiveness of the feedback at high signal levels. A design of LDC adapted to double-edged pulse width modulation is shown in FIG. 29. In the corrector shown in FIG. 29, the signal y is fed through a cubic nonlinearity to furnish $y^3/12$, which is subtracted from the signal to furnish output x and is also fed back though a transfer function $5/2.z^{-1}-2.z^{-2}+z^{-3}/2$. The scaling of x is such that x=0 corresponds to zero pulse length and x=1 corresponds to a length 100% of the pulse repetition period. It is possible for the signal y to become transiently greater than 1, but a clip level of ±2 allows plenty of headroom. A clipper may be provided to prevent overload from sending the local feedback into persistent oscillation, and a clipper operating at levels of ±0.125 would be satisfactory in the position shown.

Figure 30:
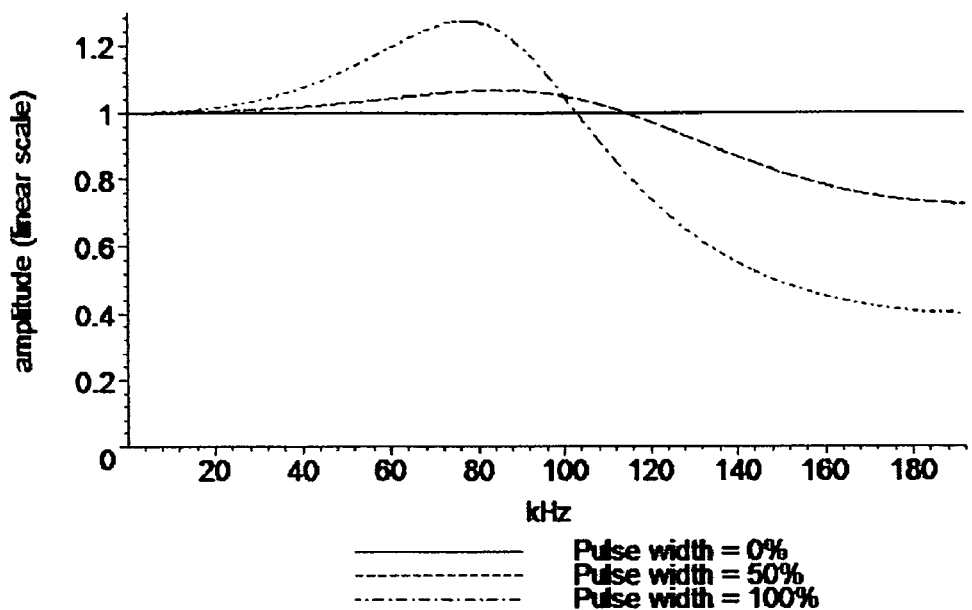
FIG. 30 shows the amplitude response of the low delay corrector unit of FIG. 29, with pulse width as parameter.

The small-signal amplitude response of the corrector of FIG. 29 is shown in FIG. 30, for pulse lengths equal to 0%, 50% and 100% of the pulse repetition period. In each case, the response is minimum phase. When combined with the PWM nonlinearity of FIG. 17, the result is flat over the operating frequency range 0-20 kHz to a high degree of accuracy. For pulse lengths other than zero, the response of LDC must start to rise over this range to combat the droop shown in FIG. 17. However, for symmetrical double-edge modulation, the nonlinearity of FIG. 17 is phaseless and so the rising amplitude response must not be accompanied by a phase advance. The constant phase response is achieved to a reasonable degree of accuracy by making the amplitude response fall at higher frequencies, as shown in FIG. 30.

Figure 31:
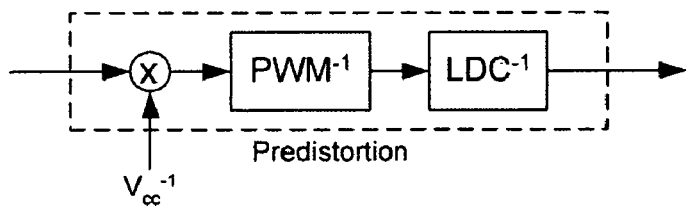
FIG. 31 shows an internal structure for the predistortion unit in FIG. 22.

The amplifier of FIG. 22 also includes predistortion which, conceptually, inverts the combination of LDC and P. As discussed in relation to FIG. 15, there is more than one way to construct such a predistortion unit: the method we shall illustrate inverts the constituent elements of a combination in reverse order, as indicated in FIG. 19. FIG. 31 shows in more detail a predistortion unit suitable for use in FIG. 22. It is only those aspects of the plant P that have been modelled by the simulator S that should be corrected in the predistortion unit, since other deviations will have been reduced by feedback. Considering the simple simulator of FIG. 21, the elements other than $F_{lin}$ are concerned with modelling the plant, and will be inverted in reverse order. Accordingly, the multiplication by $V_{cc}$ in FIG. 21 is inverted by a multiplication by $V_{cc}^{-1}$ in FIG. 31. Next, the representation of PWM nonlinearity that appears to the left of the dashed line in FIG. 21 is inverted by the element $PWM^{-1}$ in FIG. 31. The prior art correction for PWM nonlinearity shown in FIG. 18 could be used as the element $PWM^{-1}$ in FIG. 31. Finally in FIG. 31 appears an inverse or approximate inverse of LDC, denoted by $LDC^{-1}$.

Figure 32:
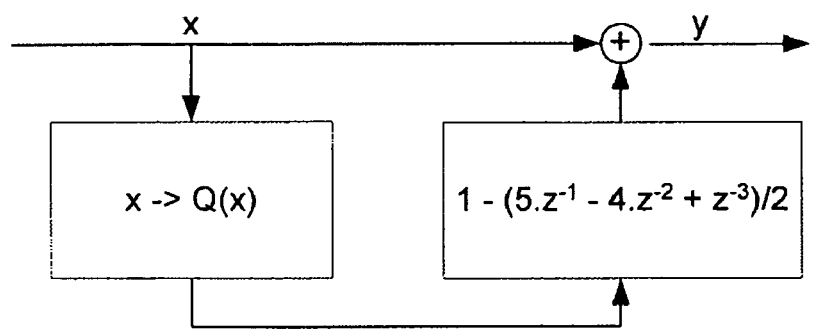
FIG. 32 shows an inverse ($LDC^{-1}$) of the low delay corrector of FIG. 29.

Assuming that the LDC of FIG. 22 is implemented as previously suggested and shown in FIG. 29, the structure of FIG. 32 will provide a suitable inverse $LDC^{-1}$. FIG. 32 inverts FIG. 29 exactly if Q(x) in FIG. 32 is the solution of:

$$Q(x)=(x+Q(x))^3/12$$

which has the series solution:

$$Q(x) = \frac{1}{12}x^3 + \frac{1}{48}x^5 + \frac{1}{144}x^7 + \frac{55}{20736}x^9 + \ldots$$

or which can be approximated numerically, for example:

$$Q(x)=0.08251487120\, x^3-0.01495088616\, x^5$$

Figure 33:
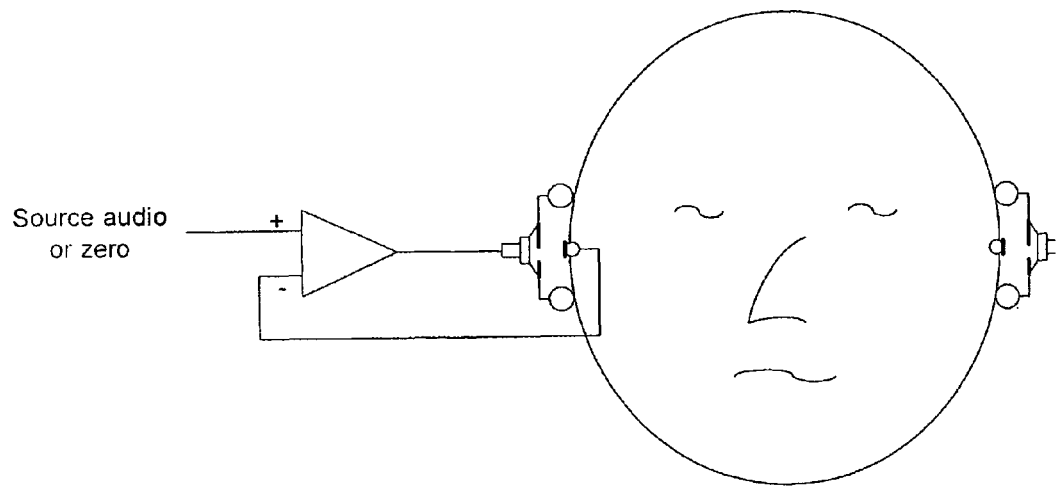
FIG. 33 shows a known feedback principle for a noise-reducing headphone.

We now apply the invention to a noise-reducing headphone. FIG. 33 shows a known system in which the listener wears a pair of 'closed ear' moving-coil headphones, each earpiece being surrounded by a soft ring that makes close contact with the listener's head so as to provide some passive attenuation of unwanted noise. A small microphone capsule senses the sound pressure in the vicinity of the listener's auditory canal. The microphone signal is amplified and fed back to the headphone in antiphase, in an attempt further to reduce the sound pressure at the microphone. A source audio signal may optionally be fed to another input of the amplifier for communication or entertainment purposes: by superposition this will not affect the reduction of external acoustic noise.

Obtaining feedback stability is not easy in practice because of the phase response of the transfer function between the headphone drive unit and the microphone.

Figure 34:
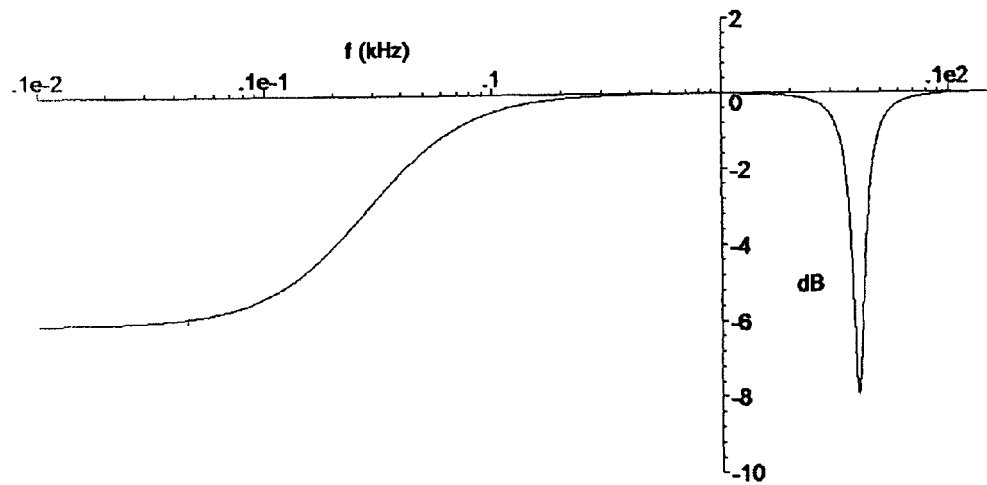
FIG. 34 shows the magnitude response of a simplified model of a noise-reducing headphone.
Figure 35:
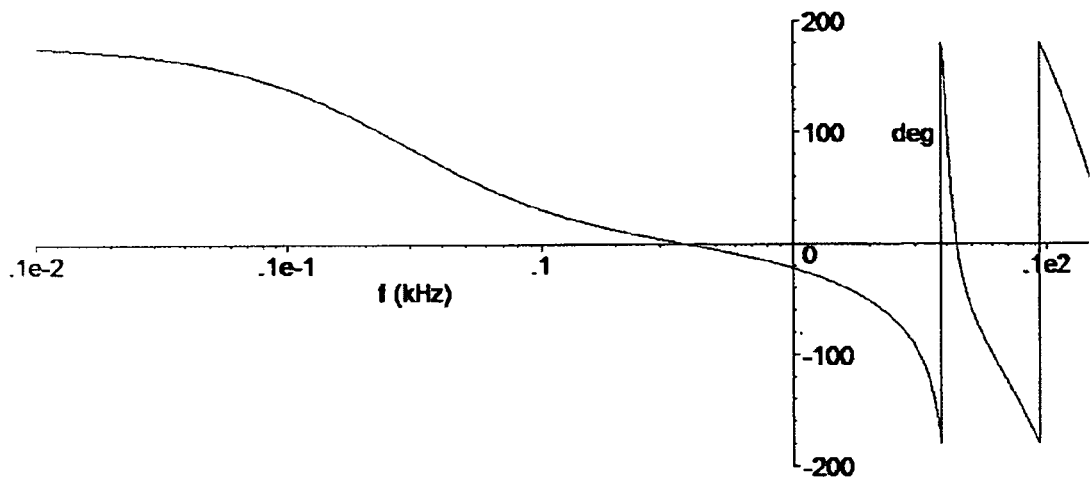
FIG. 35 shows the phase response of a simplified model of a noise-reducing headphone.

FIG. 34 and FIG. 35 show, respectively, the amplitude response (in dB) and the phase response (in degrees) of a simplified model derived from measurements of a real headphone and microphone combination. The amplitude response of the model is flat across the central part of the audio range 100 Hz to 2.5 kHz, but the phase has lagged by about 180° by 2.5 kHz. These curves were plotted from the model transfer function:

$$P(s) = (e^{(-s\tau)}) \cdot \left(\frac{-1+\frac{s}{40\pi}}{2+\frac{s}{40\pi}}\right) \cdot \left(\frac{1-0.1\left(\frac{s}{8000\pi}\right)+\left(\frac{s}{8000\pi}\right)^2}{1+0.25\left(\frac{s}{8000\pi}\right)+\left(\frac{s}{8000\pi}\right)^2}\right)$$

which contains three terms, none of which is minimum-phase. The term $e^{(-s\tau)}$ is pure delay, where $\tau=67$ µs. The second term gives the 6 dB reduction in amplitude of low frequencies centred on about 30 Hz. Because of its non-minimum-phase numerator, there is a phase reversal of very low frequencies. The third term is the sharp notch at 4 kHz, again with a non-minimum-phase numerator giving a very rapid phase change totalling 360° in the vicinity of 4 kHz.

Because of the delay and other non-minimum-phase terms, even to obtain a few dB of feedback over a limited frequency range such as 100 Hz-1 kHz requires careful design.

The measurements from which this model was derived show also substantial amplitude peaks and dips above 5 kHz. Since these are minimum-phase, they can be compensated and it might be supposed that they present less of a problem to feedback stability. In practice however, ragged high-frequency behaviour may not be reproducible and straightforwardly compensatable.

Figure 36:
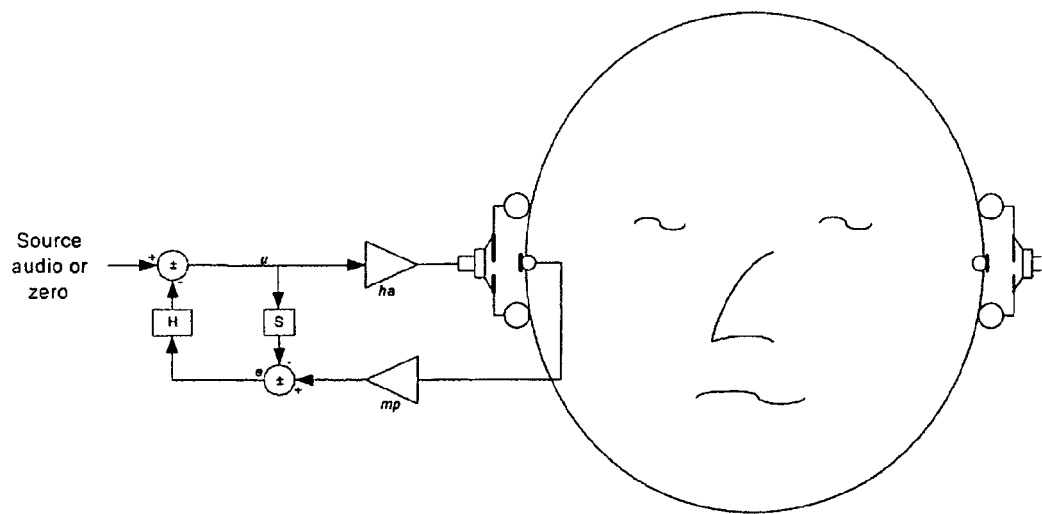
FIG. 36 shows a noise-reducing headphone according to the invention.

According to the invention, a feedback controller is provided comprising a simulator S as shown in FIG. 36. The headphone amplifier ha, the headphone and the acoustic space that it encloses may be considered to form the plant P in FIG. 9, the microphone and the microphone preamplifier mp forming the measurement path F. Alternatively the conceptual model of FIG. 5 may be used, with the responses of the microphone and its preamplifier being accounted for within the assumed transfer function of P.

Considering the likely nonlinear behaviour of the headphone, it may be advantageous to use a nonlinear simulator that models, for example, the increasing stiffness typical of a moving-coil suspension at high excursions. In any case, it is likely that the plant's behaviour will be less well characterised at high signal levels, and it may be necessary to use a signal limiting device as shown in FIG. 10 in order to prevent such high levels from being exercised. In this audio application, a soft clipper may be preferred as the signal-limiting device.

We now consider optimisation of the small signal behaviour, so nonlinearity of the headphone and the simulator will be ignored.

If the signal path in FIG. 36 is sampled and the feedback filter H is implemented as a transversal filter, the least-squares procedure already described may be used to compute the tap weights of H. Because of the non-minimum-phase factors in P(s), it is not possible to reduction of the external noise at all frequencies by means of feedback. Indeed it is inevitable that the noise will be increased at some frequencies. The best balance of advantage can be obtained by adjusting weights $W_i$ using knowledge of the likely spectrum of the external noise that remains when only passive attenuation is used, and its annoyance value as a function of frequency, a higher weight $W_i$ leading to a greater reduction by feedback at frequency $\omega_i$ relative to other frequencies.

As discussed previously, stability is assured to the extent that the plant's response conforms to that of the simulator. However, we have already noted that at high frequencies the headphone's response is ragged and probably unpredictable. It would also be unwise to rely on the response in the vicinity of the dip at 4 kHz, since it requires only a small absolute perturbation to the response to change the numerator factor in P(s) that causes this dip from being a non-minimum-phase factor to being a minimum-phase factor, with a consequent radical change in the phase response. We have discussed with reference to FIG. 13 a method to adapt at least the simulator's response to follow variations in the plant in order to maintain stability.

A simpler method is to reduce the amplitude response of H in frequency regions where the response of the plant is uncertain or variable. In the least-squares formalism already described, this can be achieved using the weight factors $N_j$, a larger weight factor tending to reduce the response of H at frequency $\omega_j$. Thus, the factors $N_j$ are useful not only for controlling measurement noise, but also for restraining the amplitude response of H in frequency regions in which the gain of the plant is uncertain.

In an analogue environment it may be inconvenient to implement a pure delay $e^{(-s\tau)}$ and to provide a transversal implementation of H. The pure delay may be transformed into a rational function of s by Pade approximation or other means, for example:

$$e^{(-s\tau)} \approx \frac{1 - \frac{1}{2}(s\tau) + \frac{1}{10}(s\tau)^2 - \frac{1}{120}(s\tau)^3}{1 + \frac{1}{2}(s\tau) + \frac{1}{10}(s\tau)^2 + \frac{1}{120}(s\tau)^3}$$

which provides an approximation accurate within 2 degrees up to 8 kHz when $\tau$=67 µs.

The following optimisation procedure, which is carried out in the s (Laplace transform) domain, may yield an H that is more suitable for analogue implementation. Assuming for simplicity that the transfer function of the measurement path (i.e. F in FIG. 9, corresponding to the microphone and associated electronics in FIG. 36) is unity, we decompose the plant's response into minimum-phase and allpass components M and A as previously discussed in relation to FIG. 5. For the headphone example we have:

$$M(s) = \left(\frac{1 + \frac{s}{40\pi}}{2 + \frac{s}{40\pi}}\right) \cdot \left(\frac{1 + 0.1\left(\frac{s}{8000\pi}\right) + \left(\frac{s}{8000\pi}\right)^2}{1 + 0.25\left(\frac{s}{8000\pi}\right) + \left(\frac{s}{8000\pi}\right)^2}\right)$$

$$A(s) = (e^{(-s\tau)}) \cdot \left(\frac{-1 + \frac{s}{40\pi}}{1 + \frac{s}{40\pi}}\right) \cdot \left(\frac{1 - 0.1\left(\frac{s}{8000\pi}\right) + \left(\frac{s}{8000\pi}\right)^2}{1 + 0.1\left(\frac{s}{8000\pi}\right) + \left(\frac{s}{8000\pi}\right)^2}\right)$$

As usual these expressions in S can be evaluated at a specific frequency $\omega$ by setting s=i$\omega$, where i=$\sqrt{-1}$. The effect of the feedback on an error, e.g. an external noise impulse in the headphone example, can be expressed as the transfer function:

$$1 - M(s).A(s).H(s)$$

from which it follows that the time-domain response to a unit error impulse $\delta(t)$ is:

$$\delta(t) - M(t) \otimes A(t) \otimes H(t)$$

where $\otimes$ denotes convolution in the time domain and where the functions M(s), A(s), H(s) have been converted to the corresponding time-domain responses M(t), A(t), H(t) using the inverse Laplace transform.

We wish to minimise this response, but with higher weight given to the more important frequency regions. Accordingly we convolve the error response with W(t), a minimum-phase impulse response chosen to so that it its spectrum has larger amplitudes at frequencies that it is desired to weight more strongly, and we choose H to minimise:

$$\|W(t) - W(t) \otimes M(t) \otimes A(t) \otimes H(t)\|$$

where $\|\bullet\|$ denotes square-integral, i.e., $$\|f(t)\| = \int_{-\infty}^{\infty} f(t)^2 \, dt$$

Given the requirement that H be causal, it can be shown that the solution to this minimisation problem is:

$$H(t) = ((A(-t) \otimes W(t)) \times \text{Heaviside}(t)) \otimes (W(t) \otimes M(t))^{-1}$$

where:
 × denotes multiplication in the time domain,
 $f(t)^{-1}$ denotes the convolutional inverse of f(t)
 Heaviside(t) is the Heaviside step function:

$$\text{Heaviside}(t) = \begin{cases} 0 & t < 0 \\ 1 & 0 < t \end{cases}$$

In words, the allpass part of the plant response A(t) is time-reversed to form the acausal response A(−t). The result is convolved with W(t) and the negative-time portion of the resulting response is set to zero to form a causal response. Finally the causal response is deconvolved with W(t) and with M(t). The result of the deconvolution is causal because W(t) and M(t) are both minimum-phase.

If A, M and W are supplied as rational functions of the Laplace Transform variable s, optionally with an explicit delay factor $e^{(-s\tau)}$ within A, then the above procedure may be carried out using Laplace Transform methods, as will now be illustrated.

For algebraic simplicity, we measure time in units of $1/(2.\pi.1000)$ sec, so that $s=i$ ($=\sqrt{-1}$) corresponds to a frequency of 1 kHz. With this convention A and M can now be expressed as:

$$A(s) = \frac{(-1+50s)\left(1 - 0.02500000000\, s + \frac{1}{16}s^2\right)e^{(-s\tau)}}{(1+50s)\left(1 + 0.02500000000\, s + \frac{1}{16}s^2\right)}$$

$$M(s) = \frac{(1+50s)\left(1 - 0.02500000000\, s + \frac{1}{16}s^2\right)}{(2+50s)\left(1 + 0.06250000000\, s + \frac{1}{16}s^2\right)}$$

where $\tau=0.4209734156$ units of time.

We assume a weighting function W(t) having Laplace transform W(s) given by:

$$W(s) = \frac{1}{(1+s)^2}$$

This choice of W(s) corresponds to weighting down the effect of errors above 1 kHz at a rate of 12 dB/8 ve. So now $$\mathcal{L}(A(-f) \otimes W(t)) = A(-s)W(s)$$

$$= e^{(s\tau)}(e^{(-s\tau)}A(-s)W(s))$$

where $\mathcal{L}$ denotes the Laplace transform. Now:

$$e^{(-s\tau)}A(-s)W(s) = \frac{(-1-50s)\left(1 + 0.02500000000\, s + \frac{1}{16}s^2\right)}{(1-50s)\left(1 - 0.2500000000\, s + \frac{1}{16}s^2\right)(1+s)^2}$$

$$= \frac{0.0014019}{1+s} + \frac{0.384852}{s - 0.0200000} + \frac{0.9166103}{(1+s)^2} +$$

$$\frac{0.0999768 - 0.0398872\, s}{s^2 - 0.4000000\, s + 16}$$

by partial fraction decomposition.

Because of the forthcoming multiplication by Heavside(t), we are not interested in values of A(-t)⊗W(t) for t<0. It follows that we are also not interested in values of:

$$\mathcal{L}^{-1}(e^{-s\tau} A(-s)W(s))$$

for t<0, where $\mathcal{L}^{-1}$ denotes the inverse Laplace transform. Therefore we may delete the acausal terms in the above partial fraction decomposition to obtain:

$$e^{(-s\tau)}A(-s)W(s) = \frac{0.0014019}{1+s} + \frac{09166103}{(1+s)^2} + \text{acausal terms}$$

Therefore substituting $\tau=0.4209734$, $$A(-t) \otimes W(t) = \mathcal{L}^{-1}(A(-s)W(s))$$

$$= \mathcal{L}^{-1}\left(\frac{0.0014019}{1+s} + \frac{0.9166103}{(1+s)^2}\right)e^{(0.4209734s)} +$$

acausal terms $$= (0.3872705 + 0.9166103\, t)e^{(-t-0.4209734)} \text{ for } t > 0.$$

$$\therefore (A(-t) \otimes W(t)) \times \text{Heaviside } (t) =$$
$$(0.3872705 + 0.9166103\, t)e^{(-t-0.4209734)} \times \text{Heaviside } (t)$$

Taking the Laplace transform of both sides:

$$\mathcal{L}((A(-t) \otimes W(t)) \times \text{Heaviside}(t)) = \frac{0.2542073\, s + 0.8558772}{(1+s)^2}$$

$$\therefore H(s) = \mathcal{L}(H(t))$$

$$= \mathcal{L}(((A(-t) \otimes W(t)) \times \text{Heaviside}(t)) \otimes (W(t) \otimes M(t))^{-1})$$

$$= \mathcal{L}(A(-t) \otimes W(t)) \times \text{Heaviside}(t)) / \mathcal{L}(W(t)) / \mathcal{L}(M(t))$$

$$= \frac{0.8558772 + 0.2542073\, s}{M(s)}$$

or in terms of H', defined as previously H=H'.M$^{-1}$, we have simply:

$$H'(s) = 0.8558772 + 0.2542073\, s$$

Figure 37:
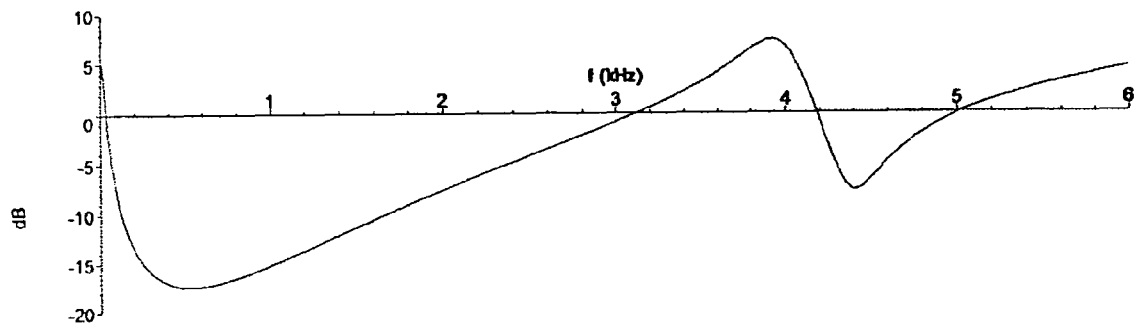
FIG. 37 shows an example error transfer function magnitude for a headphone according to the invention.

The resulting error transfer function:

$$|1-M(s).A(s).H(s)| = |1-A(s).H'(s)|$$

is plotted in FIG. 37. 17.4 dB of feedback attenuation is obtained at 500 Hz, but feedback increases the error above 3.1 kHz. Feedback also increases the error below 30 Hz, because of the low-frequency allpass factor in A(s).

The above case has been shown to illustrate a design method that results in a rational transfer function suitable for analogue implementation. The method can be automated if desired using a computer algebra package such as Maple or Mathematica. The H'(s) that results in this case does not provide more feedback than the simple choice H'(s)=1, though it does extend, from 2 kHz to 3.1 kHz, the upper limit of the range over which feedback reduces the error. If it is desired to provide large error reduction over a particular operating frequency range, the procedure may be repeated with a W(s) having a large amplitude gain over that range and smaller elsewhere.

The H'(s) exhibited above has an amplitude gain that increases, slowly but without limit, above about 3 kHz. In practice the gain maximum would need to be limited and we now describe a modification to the method that furnishes an H'(s) whose gain maximum gain can be controlled or whose high-frequency gain is reduced in the manner shown in FIG. 8.

To do this, we penalise the response of H in certain frequency regions, as has been described earlier using weights $N_j$ for the least-squares design of a transversal implementation of H. We construct a minimum-phase impulse response N(t) so that it its spectrum has larger amplitudes at frequencies where it is desired to reduce the response of H. The quantity to be minimised is now:

$$\|W(t) - W(t) \otimes M(t) \otimes A(t) \otimes H(t)\| + \|N(t) \otimes H(t)\|$$

To perform the minimisation we introduce an auxiliary minimum-phase function Q(s) that corresponds to a noise source whose power spectrum is the sum of the power spectra of W(s) and N(s), that is:

$$Q(s).Q(-s)=W(s).W(-s)+N(s).N(-s)$$

If it is assumed that W(s) and N(s) have been provided as rational functions of s, then Q(s) may be computed by expressing the right hand side of the above equation as a rational function of s having a numerator and a denominator and factorising the numerator and the denominator as a product of factors that are linear or quadratic in s. Each causal factor should have a corresponding acausal factor in which "s" is replaced by "−s". The acausal factors are then deleted and the resulting rational function, which contains only causal factors, is Q(s).

It can be shown that the solution to the minimisation problem is:

$$H(t)=((A(-t)\otimes W(t)\otimes W(-t)\otimes (Q(-t)^{-1}))\times \text{Heaviside}(t))\otimes (Q(t)\otimes M(t))^{-1}$$

where, as before, the superscript "$^{-1}$" denotes convolutional inverse, so that $(Q(-t)^{-1})$ is the convolutional inverse of the time-reverse of Q. This solution for H(t) may be evaluated using Laplace transform methods as described above.

Figure 38:
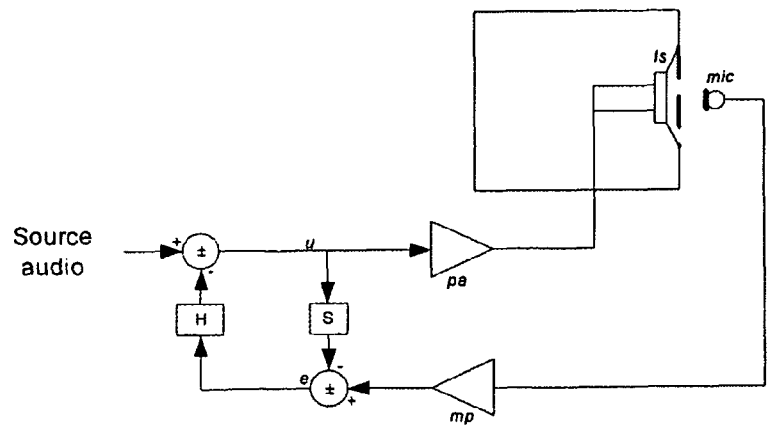
FIG. 38 shows a loudspeaker with negative feedback taken via a microphone.

FIG. 38 shows an application to a loudspeaker. A power amplifier pa drives a loudspeaker ls. The acoustic output of the loudspeaker is sampled by a microphone mic and amplified by a microphone preamplifier mp. A simulator S and feedback filter H are provided as in the headphone application of FIG. 36. This application is similar in several ways to the headphone application, but the primary purpose of the feedback in the loudspeaker application is likely to be the reduction of nonlinear distortion in the loudspeaker drive unit. It is likely that the feedback design will need to take account of nonlinear behaviour of the drive unit: this can be done either by making the simulator S model a nonlinear aspect of the drive unit's behaviour. Alternatively a nonlinear compensation unit may be inserted immediately before the power amplifier pa, following which the "plant", comprising the compensation unit as well as the amplifier pa and the drive unit ls, may be considered to be substantially linear within its range, and a linear simulator S may be used, subject to attention being paid to overload behaviour, for example using a signal limiting device as discussed with reference to FIG. 10.

If a nonlinear simulator is used, then it is preferred to use also a predistortion unit as described with reference to FIG. 11. Since loudspeaker characteristics can change with time and with temperature, an adaptively updated nonlinear model may be. Nonlinear modelling and adaptive characterisation of loudspeaker drive units has been extensively researched: see for example Mihelich, R. J., "Loudspeaker Nonlinear Parameter Estimation: An Optimization Method", Audio Eng. Soc. 111th Convention, preprint number 5419 (2001 November) and references cited therein. If a nonlinear simulator is used, then a predistortion unit.

The small-signal transfer function of the plant and feedback path in FIG. 38 will contain significant deviations from unity contributed by the loudspeaker drive unit, the propagation delay from the loudspeaker to the microphone, and from the local acoustic environment. As in the headphone example, the propagation delay contributes an allpass factor $e^{(-s\tau)}$, but τ should be substantially constant as the microphone will be generally fixed relative to the drive unit. The local acoustic environment will generally be minimum-phase, but can be expected to vary with loudspeaker placement and with temperature-induced variation in room resonance frequencies etc. It will be seen from the headphone example that the calculation of H' is independent of the minimum-phase part M of the plant's response. Hence in a manufactured fixed combination of speaker and microphone, it is possible to determine H' at the time of manufacture. An adaptation unit, such as has been discussed with reference to FIG. 13, can track variations in M and fold a dynamically adjusted $M^{-1}$ with a predetermined H' to furnish a continuously updated H. Alternatively, H' and $M^{-1}$ can be implemented as separate filters in cascade. The adaptation unit should also convey information about M to the simulator S, as indicated in FIG. 13. In the nonlinear case, a simulator consisting of a nonlinear part followed in cascade with a linear filter M is likely to be suitable.

Loudspeaker drive units driven at low frequencies and high amplitudes can sometimes generate subharmonics or can 'flip' between one persistent state and another. This behaviour cannot be modelled by a simulator that furnishes its output in as a function of the plant's input and its recent history alone. One approach to this problem would be to extend the function of the adaptation unit to deduce information about the current state of the plant and to guide the simulator accordingly. This information could be deduced from the plant's output alone, or from supplemental monitoring of other measurable quantities associated with the plant. In the case of a loudspeaker, the voicecoil displacement of a moving-coil drive unit will provide information that will enable most ambiguities about the driver's state to be resolved. This displacement can be determined by a supplementary displacement transducer attached to the loudspeaker cone or voicecoil, for example operating on a Hall effect or photoelectric principle.

Alternatively, an auxiliary transducer sensing displacement, velocity or acceleration, could be used in a local feedback loop to ensure deterministic behaviour that can be simulated. For example, it is drive units that have very little damping that generate subharmonics. If a velocity signal is fed locally back to the amplifier pa in the correct phase, this will damp the motion and eliminate subharmonics.

Figure 39:
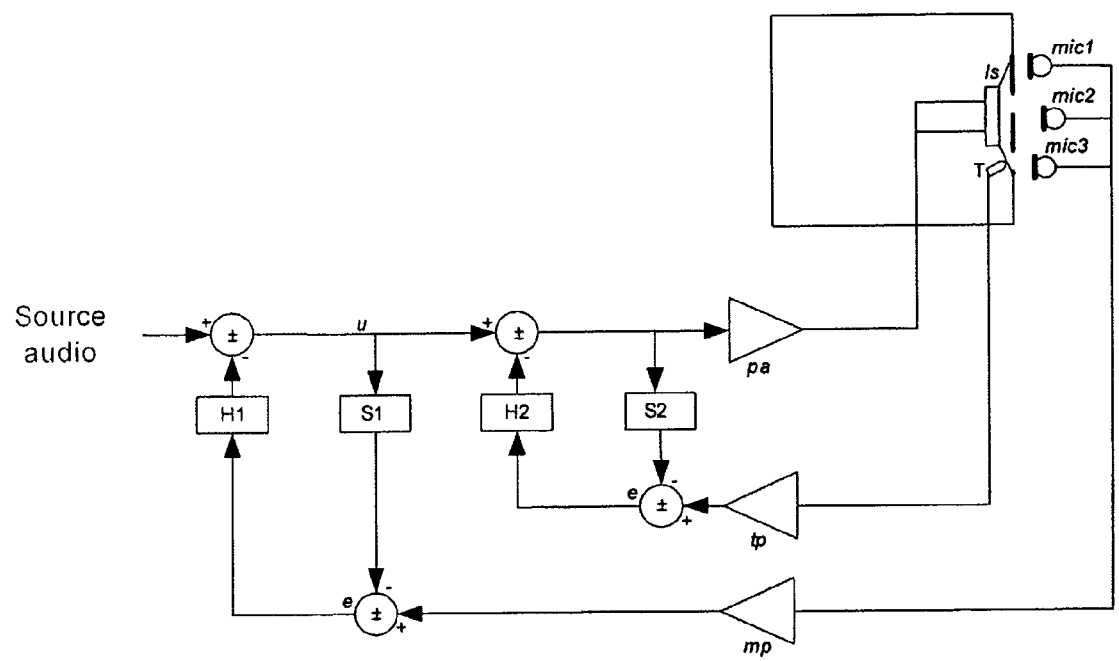
FIG. 39 shows nested feedback to control a loudspeaker.

It could be advantageous to apply the current invention to the local feedback loop also, as shown in FIG. 39. A transducer T senses the voicecoil motion: its signal is amplified (if necessary) by the transducer preamplifier tp and fed back through loop filter H2. The simulator S2 models the path from the input of the power amplifier pa to the output of tp. The acoustic output of the loudspeaker is sensed by one or more microphones m1, m2, m3, and fed back through loop filter H1. The simulator S1 models the path from point u in FIG. 39 to the output of mp, including the effect of the local feedback from the transducer T.

Design of the simulators S1, S2 and the loop filters H1, H2 proceeds as described already. The inner loop using S2 and H2 is designed first, and the output loop using S1 and H1 is designed in the knowledge of the small-signal transfer function furnished by the inner loop. If nonlinearity is being modelled in the outer loop, then information about nonlinearity also needs to be propagated from the design of the inner loop to that of the outer. Further, while feedback according to the invention makes the plant's behaviour more consistent over an operating frequency range, it is likely to increase variability, noise, distortion etc outside that range. This increase is in proportion to the error transfer function |1−H'.A| as already discussed. The variability etc. increase produced by the inner loop must be taken into account in design of the outer loop, and the gain of H2 should be controlled accordingly using noise weights $N_j$ or a noise weighting function N(s) as already discussed. It is not desirable that the two loops should have error transfer functions that peak at the same frequency. Fortunately the inner loop should have a lower delay and so it error transfer function can peak at a higher frequency.

A moving-coil drive unit emits sound from its cone and from the cone surround, and the two emissions may have different nonlinear content. It is the total nonlinear content in the far field that is important to the listener, but a microphone placed in the far field will incur excessive delay. As indicated in FIG. 39, two more close microphones may be used with appropriately chosen positions (and possibly gain and/or frequency weightings) to simulate the far field nonlinear response but without incurring the delay of a microphone placed in the far field.

The concepts described herein apply equally to electrical, mechanical, hydraulic and other systems, or to mixed systems. In the diagrams, any conversions (for example, between electrical and mechanical representations of a signal, or between analogue and digital representations) are taken for granted and not shown. Likewise, the mere provision of "voltage gain" or of attenuation is not considered an issue. Therefore, all signals have been scaled (normalised) and the "plant" P is assumed in various places to have a gain that approximates to unity.

It should be noted that the invention may also be used to control a system having more than one degree of freedom, such as the stylus assembly of a stereophonic disc-cutting lathe. In this case the term "signal" needs to be interpreted as a multidimensional or multichannel signal, and the various filters shown need to be implemented as multichannel filters or matrix filters.

The invention claimed is:

1. A method of controlling by feedback the behaviour of a plant having an input and an output, the method comprising the steps of:
   receiving an input signal;
   predistorting the input signal to provide a predistorted signal;
   deriving a plant input signal and a simulation input signal from the predistorted signal;
   applying the plant input signal to the input of the plant;
   deriving a plant feedback signal from an output of the plant;
   generating a simulated signal by simulating an assumed nonlinear behaviour of the plant in dependence on the simulation input signal;
   generating a difference signal by subtracting the simulated signal from the plant feedback signal; and,
   modifying the predistorted signal by feedback in dependence on the difference signal,
   wherein the step of modifying the predistorted signal by feedback is performed prior to the step of deriving the plant input signal and the simulation input signal from the input signal and wherein the modifying the predistorted signal by feedback is not configured to linearise the assumed nonlinear behavior of the plant.

2. A method according to claim 1, wherein the step of generating the simulated signal further comprises simulating the step of deriving the plant feedback signal.

3. A method according to claim 1, wherein the step of modifying the input signal by feedback reduces an effect on the plant output of a deviation in actual behaviour of the plant from the assumed behaviour of the plant over a predetermined operating frequency range.

4. A method according to claim 1, wherein the step of deriving a plant feedback signal comprises measuring the output of the plant.

5. A method according to claim 1, wherein the step of deriving a plant feedback signal comprises taking a replica of the output of the plant.

6. A method according to claim 1, wherein the simulated aspect is a nonlinear aspect.

7. A method according to claim 1, wherein the simulated aspect is a non-minimum-phase aspect.

8. A method according to claim 1, wherein the step of generating a simulated signal comprises the step of modelling an overload behaviour of the plant.

9. A method according to claim 1, wherein the step of generating a simulated signal is performed responsively to factors that cause variation in the response of the plant.

10. A method according to claim 1, wherein the step of generating a simulated signal is performed responsively to an internal state of the plant.

11. A method according to claim 1, further comprising: characterizing an aspect of the behaviour of the plant, wherein the step of generating a simulated signal is performed in dependence on the characterisation.

12. A method according to claim 11, wherein the step of characterising is performed at start-up.

13. A method according to claim 11, wherein the step of characterising is performed continuously during normal operation of the plant.

14. A method according to claim 3, wherein the step of modifying comprises a step of filtering the difference signal to compensate a small-signal amplitude response of the plant over the predetermined operating frequency range.

15. A method according to claim 3, wherein the step of modifying comprises a step of filtering the difference signal to compensate over the predetermined operating frequency range the combination of a small-signal amplitude response of the plant and a modification to the small-signal amplitude response produced by the step of deriving the plant feedback signal.

16. A method according to claim 1, wherein the step of modifying comprises a step of increasing the amplitude of the difference signal at predetermined frequencies outside an operating frequency range in order to reduce a phase lag within the operating frequency range.

17. A method according to claim 11, further comprising the step of filtering the difference signal, wherein the filtering is performed responsively to the characterisation.

18. A method according to claim 1, further comprising: partially or wholly compensating for a nonlinear behaviour of the plant over an operating frequency range.

19. A method according to claim 18, wherein the step of compensating is performed to minimise additional delay.

20. A method according to claim 18, wherein the step of compensating is performed using a nonlinear filter having a minimum-phase small-signal response.

21. A feedback controller for controlling a plant, the controller comprising:
   a first input for receiving an input signal;
   a second input adapted to receive a feedback signal derived from an output signal of the plant;
   a controller output adapted to provide an input signal to the plant;
   a predistortion unit coupled to the first input, the predistortion unit adapted to predistort the input signal to provide a predistorted signal;
   a simulator coupled to an output of a modifying unit, the simulator adapted to generate a simulated signal by simulating an assumed nonlinear behaviour of the plant in dependence on the plant input signal;

a difference unit coupled to the second input and to the simulator, the difference unit configured to provide a difference signal in dependence on the feedback signal and the simulated signal; and, the modifying unit coupled to each of the difference unit, the predistortion unit, and the controller output, the modifying unit adapted to modify the predistorted signal in dependence on the difference signal, wherein modifying the predistorted signal is not configured to linearise the assumed nonlinear behavior of the plant.

22. A controller according to claim 21, wherein the modifying unit is adapted to modify the predistorted signal to reduce an effect on the plant output signal over a predetermined operating frequency range of a deviation in actual behaviour of the plant from the assumed behaviour of the plant.

23. A controller according to claim 21, wherein the simulator is adapted to simulate a nonlinear aspect.

24. A controller according to claim 21, wherein the simulator is adapted to simulate a non-minimum-phase aspect.

25. A controller according to claim 21, wherein the simulator is adapted to provide a simulated signal that minimises the magnitude of the difference signal.

26. A controller according to claim 21, further comprising an adaptation unit coupled to the simulator, the adaptation unit configured to adapt the simulator to provide a simulated signal that minimises the magnitude of the difference signal.

27. A controller according to claim 22, wherein the modifying unit comprises a filter adapted to compensate a small-signal amplitude response of the plant over the predetermined operating frequency range.

28. A controller according to claim 21, further comprising an adaptation unit coupled to the second input and to the simulator, the adaptation unit configured to deduce an aspect of the behaviour of the plant in dependence on the plant output signal and to adapt the simulator in dependence on the deduced aspect.

29. A controller according to claim 27, further comprising an adaptation unit coupled to the second input and to the simulator, the adaptation unit configured to deduce an aspect of the behaviour of the plant in dependence on the plant output signal and to adapt the filter in dependence on the deduced aspect.

30. A controller according to claim 21, further comprising a low-delay corrector (LDC) coupled to the predistortion unit.

31. A feedback controlled plant comprising:
a plant having a plant input and a plant output;
a feedback controller for controlling the plant, the feedback controller comprising:
a first input for receiving an input signal;
a second input adapted to receive a feedback signal derived from an output signal of the plant;
a controller output adapted to provide an input signal to the plant;
a predistortion unit coupled to the first input, the predistortion unit adapted to predistort the input signal to provide a predistorted signal;
a simulator coupled to the controller output, the simulator adapted to generate a simulated signal by simulating an assumed nonlinear behaviour of the plant in dependence on the plant input signal;
a difference unit coupled to the second input and to the simulator, the difference unit configured to provide a difference signal in dependence on the feedback signal and the simulated signal; and,
a modifying unit coupled to each of the difference unit, the predistortion unit, and the controller output, the modifying unit adapted to modify the predistorted signal in dependence on the difference signal, wherein modifying the predistorted signal is not configured to linearise the assumed nonlinear behavior of the plant;

wherein the plant output is coupled to the controller output and the plant output is coupled to the second input of the controller.

32. A feedback-controlled plant according to claim 31, wherein the plant comprises a loudspeaker.

33. A feedback-controlled plant according to claim 32, wherein the second input of the feedback controller is adapted to receive an acoustical signal generated by the loudspeaker.

34. A feedback-controlled plant according to claim 32, wherein the second input of the controller is adapted to receive a mechanical signal generated by the loudspeaker.

35. A feedback-controlled plant according to claim 32, wherein the plant further comprises a plurality of microphones configured to provide an output that represents a nonlinear aspect of an acoustical signal generated by the loudspeaker and received by a listener situated at a greater distance from the loudspeaker than the plurality of microphones.

36. A feedback-controlled plant comprising:
a predistortion unit that receives an input signal, the predistortion unit adapted to predistort the input signal to provide a predistorted signal;
a splitter that receives predistorted signal and provides a plant input signal and a simulation input signal;
a plant having an input that receives the plant input signal and an output that outputs a plant output signal;
a simulator having an input that receives the simulation input signal, the simulator adapted to generate a simulated signal by simulating an assumed nonlinear behaviour of the plant in dependence on the simulation input signal;
a difference unit coupled to the simulator and the plant output, the difference unit configured to provide a difference signal in dependence on the simulated signal and a feedback signal derived from the plant output signal; and,
a modifying unit coupled to each of the difference unit and the splitter input, the modifying unit adapted to modify the predistorted signal in dependence on the difference signal, wherein modifying the predistorted signal is not configured to linearise the assumed nonlinear behavior of the plant.

37. A feedback-controlled plant according to claim 36, wherein the plant comprises a headphone and the second input of the controller receives an acoustical signal generated by the headphone.

38. A plant according to claim 36, wherein the modifying unit is adapted to modify the input signal to reduce an effect on the output signal of a deviation in actual behaviour of the plant from the assumed behaviour of the plant over a predetermined operating frequency range.

39. A plant according to claim 36, wherein the simulated aspect is a nonlinear aspect.

40. A plant according to claim 36, wherein the simulated aspect is a non-minimum-phase aspect.

41. A plant according to claim 38, wherein the modifying unit comprises a filter adapted to compensate the small-signal amplitude response of the plant over the operating frequency range.

42. A plant according to claim 36, further comprising an adaptation unit coupled to the plant and the simulator, the adaptation unit adapted to dynamically adjust the simulator in dependence on the actual behaviour of the plant.

43. A plant according to claim 41, further comprising an adaptation unit coupled to the plant and the filter, the adaptation unit adapted to dynamically adjust the filter in dependence on the actual behaviour of the plant.

44. A plant according to claim 36, further comprising a low-delay corrector (LDC) coupled to the splitter input.

45. A feedback-controlled plant according to claim 36, wherein the plant comprises a loudspeaker.

* * * * *